United States Patent
Wu et al.

(10) Patent No.: US 10,524,292 B2
(45) Date of Patent: Dec. 31, 2019

(54) METHOD FOR GENERATING RANDOM ACCESS CHANNEL ZC SEQUENCE, AND APPARATUS

(71) Applicant: Huawei Technologies Co., Ltd., Shenzhen (CN)

(72) Inventors: Qiang Wu, Beijing (CN); Zhiheng Guo, Beijing (CN); Jianqin Liu, Beijing (CN); Jianghua Liu, Beijing (CN); Leiming Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 197 days.

(21) Appl. No.: 15/367,545

(22) Filed: Dec. 2, 2016

(65) Prior Publication Data

US 2017/0086228 A1    Mar. 23, 2017

Related U.S. Application Data

(63) Continuation of application No. PCT/CN2015/080600, filed on Jun. 2, 2015, which is
(Continued)

(51) Int. Cl.
*H04W 74/08* (2009.01)
*H04J 13/00* (2011.01)
*H04J 13/14* (2011.01)

(52) U.S. Cl.
CPC ..... *H04W 74/0833* (2013.01); *H04J 13/0062* (2013.01); *H04J 13/14* (2013.01); *H04W 74/08* (2013.01); *H04J 2211/005* (2013.01)

(58) Field of Classification Search
CPC ............... H04W 74/08; H04W 74/0833; H04J 13/0055; H04J 13/0059; H04J 13/0062;
(Continued)

(56) References Cited

U.S. PATENT DOCUMENTS

| 2008/0168114 A1* | 7/2008 | Han | H04J 13/0062 708/209 |
| 2009/0046629 A1* | 2/2009 | Jiang | H04J 13/0059 370/328 |

(Continued)

FOREIGN PATENT DOCUMENTS

| CN | 101466153 A | 6/2009 |
| CN | 101641925 A | 2/2010 |

(Continued)

OTHER PUBLICATIONS

3rd Generation Partnership Project; Technical Specification Group Radio Access Network; Evolved Universal Terrestrial Radio Access (E-UTRA); Physical channels and modulation (Release 12), 3GPP TS 36.211 V12.1.0 (Apr. 2014), 120 pages.

(Continued)

*Primary Examiner* — Kevin D Mew
(74) *Attorney, Agent, or Firm* — Slater Matsil, LLP

(57) ABSTRACT

Embodiments provide a method for generating a random access channel ZC sequence, and an apparatus. A method for generating a random access channel ZC sequence includes: generating, by a base station, notification signaling, where the notification signaling instructs user equipment UE to generate a random access ZC sequence by using a second restricted set in a random access set; and sending, by the base station, the notification signaling to the UE, so that the UE generates the random access ZC sequence by using the second restricted set, where the random access set includes an unrestricted set, a first restricted set, and the second restricted set; and the second restricted set is a random access set that the UE needs to use when a Doppler frequency shift of the UE is greater than or equal to a first predetermined value.

16 Claims, 12 Drawing Sheets

Related U.S. Application Data a continuation of application No. PCT/CN2014/079086, filed on Jun. 3, 2014.

(58) Field of Classification Search
CPC ... H04J 13/14; H04J 2211/00; H04J 2211/005
See application file for complete search history.

(56) References Cited

U.S. PATENT DOCUMENTS

| | | | | |
|---|---|---|---|---|
| 2009/0073944 | A1* | 3/2009 | Jiang | H04J 11/00 370/338 |
| 2011/0086658 | A1* | 4/2011 | Baldemair | H04J 13/0059 455/507 |
| 2014/0321398 | A1* | 10/2014 | Guo | H04W 74/0833 370/329 |
| 2015/0351061 | A1* | 12/2015 | Kim | H04W 56/00 370/252 |
| 2015/0373656 | A1* | 12/2015 | Kim | H04W 76/14 370/350 |
| 2016/0345365 | A1 | 11/2016 | Vujcic et al. | |
| 2017/0055297 | A1* | 2/2017 | Da | H04J 13/0055 |
| 2017/0086228 | A1* | 3/2017 | Wu | H04W 74/08 |
| 2017/0094686 | A1* | 3/2017 | Ramamurthi | H04W 72/0406 |
| 2017/0295597 | A1* | 10/2017 | Lee | H04W 72/04 |
| 2017/0367120 | A1* | 12/2017 | Murray | H04B 7/0695 |
| 2018/0242370 | A1* | 8/2018 | Zhao | H04L 5/0021 |

FOREIGN PATENT DOCUMENTS

| | | |
|---|---|---|
| CN | 101651986 A | 2/2010 |
| CN | 102036408 A | 4/2011 |
| CN | 102119577 A | 7/2011 |
| CN | 102307054 A | 1/2012 |
| CN | 102340472 A | 2/2012 |
| CN | 102469466 A | 5/2012 |
| CN | 102611673 A | 7/2012 |
| CN | 103079227 A | 5/2013 |
| CN | 103634926 A | 3/2014 |
| EP | 2456155 A1 | 5/2012 |
| EP | 2922358 A1 | 9/2015 |
| EP | 2456155 B1 | 6/2018 |
| JP | 2010516076 A | 5/2010 |
| RU | 2429567 C2 | 9/2011 |
| WO | 2009149760 A1 | 12/2009 |
| WO | 2017029552 A1 | 2/2017 |

OTHER PUBLICATIONS

Alcatel Lucent, "A New Cyclic Shift Restriction Set for Very High Speed Cells," 3GPP TSG-RAN WG4 Meeting #76, R4-154364, Beijing, China, Aug. 24-38, 2015, 8 pages.

* cited by examiner

METHOD FOR GENERATING RANDOM ACCESS CHANNEL ZC SEQUENCE, AND APPARATUS

CROSS-REFERENCE TO RELATED APPLICATIONS

This application is a continuation of International Application No. PCT/CN2015/080600, filed on Jun. 2, 2015, which claims priority to International Application No. PCT/CN2014/079086, filed on Jun. 3, 2014. The disclosures of the aforementioned applications are hereby incorporated by reference in their entireties.

TECHNICAL FIELD

The present invention relates to communications technologies, and in particular, to a method for generating a random access channel ZC sequence, and an apparatus.

BACKGROUND

When user equipment (UE) communicates with a base station during high-speed moving, signal frequencies of a receive end of the UE and a receive end of the base station may change, which is referred to as a Doppler frequency shift $f_D$. $f_D = fv/c$, where f is a carrier frequency, v is a moving speed, and c is a speed of light.

In an existing Long Term Evolution (LTE) system, when a speed of a vehicle is 350 km/h, and a carrier frequency is 2.6 GHz, a corresponding Doppler offset is $$2.6 \times 10^9 \times \frac{350 \times 10^3}{3 \times 10^8 \times 3600} = 843 \, Hz,$$

where 843 Hz is less than one physical random access channel (PRACH) subcarrier spacing (that is, 1.25 KHz). To avoid mutual interference between multiple UE random access sequences caused by a Doppler frequency shift, the existing LTE system is dedicatedly designed for a terminal in high-speed moving, and the design is based on a premise that the Doppler frequency shift is less than one time the PRACH subcarrier spacing. However, as requirements for wireless communication continuously increase, when the LTE system performs communication at a higher operating frequency, the Doppler frequency shift may be greater than one time the PRACH subcarrier spacing and less than two times the PRACH subcarrier spacing.

However, in the existing LTE system, when the Doppler frequency shift is greater than one time the PRACH subcarrier spacing and less than two times the PRACH subcarrier spacing, there is a problem of mutual interference between multiple UE random access sequences.

SUMMARY

Embodiments of the present invention provide a method for generating a random access channel ZC sequence, and an apparatus.

The embodiments of the present invention provide a method for generating a random access channel ZC sequence. The method includes generating, by a base station, notification signaling, where the notification signaling is used to instruct user equipment UE to generate a random access ZC sequence by using a second restricted set in a random access set. The method also includes sending, by the base station, the notification signaling to the UE, so that the UE generates the random access ZC sequence by using the second restricted set, where the random access set includes an unrestricted set, a first restricted set, and the second restricted set. The method also includes the second restricted set is a random access set that the UE needs to use when a Doppler frequency shift of the UE is greater than or equal to a first predetermined value, and the first predetermined value is greater than one time a physical random access channel PRACH subcarrier spacing.

The embodiments of the present invention further provide a method for generating a random access channel ZC sequence. The method includes receiving, by user equipment UE, notification signaling from a base station, where the notification signaling is used to instruct the UE to generate the random access ZC sequence by using a second restricted set in a random access set. The method also includes generating, by the UE, a random access ZC sequence according to the second restricted set, where the random access set includes an unrestricted set, a first restricted set, and the second restricted set; and the second restricted set is a random access set that the UE needs to use when a Doppler frequency shift of the UE is greater than or equal to a first predetermined value, and the first predetermined value is greater than one time a physical random access channel PRACH subcarrier spacing.

The embodiments of the present invention further provide a method for generating a random access channel ZC sequence. The method includes selecting, by a base station, a shift serial number v from a range of 0 to $(n_{shift}^{RA} n_{group}^{RA} + \bar{n}_{shift}^{RA} - 1)$, where v is a positive integer, $n_{shift}^{RA}$ is a quantity of candidate sequence shifts of user equipment UE in one group, $n_{group}^{RA}$ is a quantity of groups, and $\bar{n}_{shift}^{RA}$ is a quantity of candidate sequence shifts of UE within a last length that is insufficient for one group. The method also includes obtaining, by the base station, a cyclic shift value v according to the shift serial number $C_v$ by using the following formula (1):

$$C_v = d_{offset} + d_{start} \lfloor v/n_{shift}^{RA} \rfloor + (v \bmod n_{shift}^{RA}) N_{CS} \quad (1),$$

where $d_{offset}$ is a shift offset, $d_{start}$ is a cyclic shift distance between neighboring groups, $n_{shift}^{RA}$ is a quantity of users that can be differentiated by one group, and $N_{CS}$ is a quantity of cyclic shifts occupied by one user; and $n_{shift}^{RA}$, $d_{start}$, $n_{group}^{RA}$, and $\bar{n}_{shift}^{RA}$ meet formulas (2) to (5); or $n_{shift}^{RA}$, $d_{start}$, $n_{group}^{RA}$, and $\bar{n}_{shift}^{RA}$ meet formulas (6) to (9); or $n_{shift}^{RA}$, $d_{start}$, $n_{group}^{RA}$, and $\bar{n}_{shift}^{RA}$ meet formulas (10) to (13):

$$n_{shift}^{RA} = \lfloor d_u/N_{CS} \rfloor \quad (2);$$

$$d_{start} = 4d_u + n_{shift}^{RA} N_{CS} \quad (3);$$

$$n_{group}^{RA} = \lfloor N_{ZC}/d_{start} \rfloor \quad (4);$$

$$\bar{n}_{shift}^{RA} = \max(\lfloor (N_{ZC} - 4d_u - n_{group}^{RA} d_{start})/N_{CS} \rfloor, 0) \quad (5);$$

$$n_{shift}^{RA} = \lfloor (N_{ZC} - 4d_u)/N_{CS} \rfloor \quad (6);$$

$$d_{start} = N_{ZC} - 4d_u + n_{shift}^{RA} N_{CS} \quad (7);$$

$$n_{group}^{RA} = \lfloor d_u/d_{start} \rfloor \quad (8);$$

$$\bar{n}_{shift}^{RA} = \min(\max(\lfloor (d_u - n_{group}^{RA} d_{start})/N_{CS} \rfloor, 0), n_{shift}^{RA}) \quad (9);$$

$$n_{shift}^{RA} = \lfloor (N_{ZC} - 3d_u)/N_{CS} \rfloor \quad (10);$$

$$d_{start}=N_{ZC}-3d_u+n_{shift}^{RA}N_{CS} \quad (11);$$

$$n_{group}^{RA}=\lfloor d_u/d_{start}\rfloor \quad (12); \text{ and}$$

$$\bar{n}_{shift}^{RA}=0 \quad (13).$$

The embodiments of the present invention further provide a method for generating a random access channel ZC sequence. The method includes selecting, by user equipment UE, a shift serial number v from a range of 0 to $(n_{shift}^{RA}n_{group}^{RA}+\bar{n}_{shift}^{RA}-1)$, where v is a positive integer, $n_{shift}^{RA}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group. The method also includes obtaining, by the UE, a cyclic shift value $C_v$ according to the shift serial number v by using the following formula (1):

$$C_v=d_{offset}+d_{start}\lfloor v/n_{shift}^{RA}\rfloor+(v \bmod n_{shift}^{RA})N_{CS} \quad (1),$$

where $d_{offset}$ is a shift offset, $d_{start}$ is a cyclic shift distance between neighboring groups, $n_{shift}^{RA}$ is a quantity of users that can be differentiated by one group, and $N_{CS}$ is a quantity of cyclic shifts occupied by one user; and generating, by the UE, a random access ZC sequence $x_{u,C_v}(n)$ according to the cyclic shift value $C_v$ by using the following formula (14):

$$x_{u,C_v}(n)=x_u((n+C_v)\bmod N_{ZC}) \quad (14),$$

where $N_{ZC}$ is a sequence length, and a ZC sequence whose root is u is defined as $$x_u(n)=e^{-j\frac{\pi un(n+1)}{N_{ZC}}},$$

where $0 \leq n \leq N_{ZC}-1$, and $n_{shift}^{RA}$, $d_{start}$, $n_{group}^{RA}$, and $\bar{n}_{shift}^{RA}$ meet formulas (2) to (5); or $n_{shift}^{RA}$, $d_{start}$, $n_{group}^{RA}$, and $\bar{n}_{shift}^{RA}$ meet formulas (6) to (9); or $n_{shift}^{RA}$, $d_{start}$, $n_{group}^{RA}$, and $\bar{n}_{shift}^{RA}$ meet formulas (10) to (13):

$$n_{shift}^{RA}=\lfloor d_u/N_{CS}\rfloor \quad (2);$$

$$d_{start}=4d_u+n_{shift}^{RA}N_{CS} \quad (3);$$

$$n_{group}^{RA}=\lfloor N_{ZC}/d_{start}\rfloor \quad (4);$$

$$\bar{n}_{shift}^{RA}=\max(\lfloor(N_{ZC}-4d_u-n_{group}^{RA}d_{start})/N_{CS}\rfloor,0) \quad (5);$$

$$n_{shift}^{RA}=\lfloor(N_{ZC}-4d_u)/N_{CS}\rfloor \quad (6);$$

$$d_{start}=N_{ZC}-4d_u+n_{shift}^{RA}N_{CS} \quad (7);$$

$$n_{group}^{RA}=\lfloor d_u/d_{start}\rfloor \quad (8);$$

$$\bar{n}_{shift}^{RA}=\min(\max(\lfloor(d_u-n_{group}^{RA}d_{start})/N_{CS}\rfloor,0),n_{shift}^{RA}) \quad (9);$$

$$n_{shift}^{RA}=\lfloor(N_{ZC}-3d_u)/N_{CS}\rfloor \quad (10);$$

$$d_{start}=N_{ZC}-3d_u+n_{shift}^{RA}N_{CS} \quad (11);$$

$$n_{group}^{RA}=\lfloor d_u/d_{start}\rfloor \quad (12); \text{ and}$$

$$\bar{n}_{shift}^{RA}=0 \quad (13).$$

The embodiments of the present invention provide a base station. The base station includes a generation module, configured to generate notification signaling, where the notification signaling is used to instruct user equipment UE to generate a random access ZC sequence by using a second restricted set in a random access set. The base station also includes a sending module, configured to send the notification signaling to the UE, so that the UE generates the random access ZC sequence by using the second restricted set. The random access set includes an unrestricted set, a first restricted set, and the second restricted set. The second restricted set is a random access set that the UE needs to use when a Doppler frequency shift of the UE is greater than or equal to a first predetermined value, and the first predetermined value is greater than one time a physical random access channel PRACH subcarrier spacing.

The embodiments of the present invention provide user equipment UE. The UE includes a receiving module, configured to receive notification signaling from a base station, where the notification signaling is used to instruct the UE to generate the random access ZC sequence by using a second restricted set in a random access set. The UE also includes a generation module, configured to generate a random access ZC sequence according to the second restricted set. The random access set includes an unrestricted set, a first restricted set, and the second restricted set; and the second restricted set is a random access set that the UE needs to use when a Doppler frequency shift of the UE is greater than or equal to a first predetermined value, and the first predetermined value is greater than one time a physical random access channel PRACH subcarrier spacing.

The embodiments of the present invention further provide a base station. The base station includes a shift serial number determining module, configured to select a shift serial number v from a range of 0 to $(n_{shift}^{RA}n_{group}^{RA}+\bar{n}_{shift}^{RA}-1)$, where v is a positive integer, $n_{shift}^{RA}$ is a quantity of candidate sequence shifts of user equipment UE in one group, $n_{group}^{RA}$ is a quantity of groups, and $\bar{n}_{shift}^{RA}$ is a quantity of candidate sequence shifts of UE within a last length that is insufficient for one group. The base station also includes a cyclic shift value determining module, configured to obtain a cyclic shift value $C_v$ according to the shift serial number v by using the following formula (1):

$$C_v=d_{offset}+d_{start}\lfloor v/n_{shift}^{RA}\rfloor+(v \bmod n_{shift}^{RA})N_{CS} \quad (1),$$

where $d_{offset}$ is a shift offset, $d_{start}$ is a cyclic shift distance between neighboring groups, $n_{shift}^{RA}$ is a quantity of users that can be differentiated by one group, and $N_{CS}$ is a quantity of cyclic shifts occupied by one user; and $n_{shift}^{RA}$, $d_{start}$, $n_{group}^{RA}$, and $\bar{n}_{shift}^{RA}$ meet formulas (2) to (5); or $n_{shift}^{RA}$, $d_{start}$, $n_{group}^{RA}$, and $\bar{n}_{shift}^{RA}$ meet formulas (6) to (9); or $n_{shift}^{RA}$, $d_{start}$, $n_{group}^{RA}$, and $\bar{n}_{shift}^{RA}$ meet formulas (10) to (13):

$$n_{shift}^{RA}=\lfloor d_u/N_{CS}\rfloor \quad (2);$$

$$d_{start}=4d_u+n_{shift}^{RA}N_{CS} \quad (3);$$

$$n_{group}^{RA}=\lfloor N_{ZC}/d_{start}\rfloor \quad (4);$$

$$\bar{n}_{shift}^{RA}=\max(\lfloor(N_{ZC}-4d_u-n_{group}^{RA}d_{start})/N_{CS}\rfloor,0) \quad (5);$$

$$n_{shift}^{RA}=\lfloor(N_{ZC}-4d_u)/N_{CS}\rfloor \quad (6);$$

$$d_{start}=N_{ZC}-4d_u+n_{shift}^{RA}N_{CS} \quad (7);$$

$$n_{group}^{RA}=\lfloor d_u/d_{start}\rfloor \quad (8);$$

$$\bar{n}_{shift}^{RA}=\min(\max(\lfloor(d_u-n_{group}^{RA}d_{start})/N_{CS}\rfloor,0),n_{shift}^{RA}) \quad (9);$$

$$n_{shift}^{RA}=\lfloor(N_{ZC}-3d_u)/N_{CS}\rfloor \quad (10);$$

$$d_{start}=N_{ZC}-3d_u+n_{shift}^{RA}N_{CS} \quad (11);$$

$$n_{group}^{RA}=\lfloor d_u/d_{start} \rfloor \quad (12); \text{ and}$$

$$\bar{n}_{shift}^{RA}=0 \quad (13).$$

The embodiments of the present invention further provide user equipment UE. The UE includes a shift serial number determining module, configured to select a shift serial number v from a range of 0 to $(n_{shift}^{RA}n_{group}^{RA}+\bar{n}_{shift}^{RA}-1)$, where v is a positive integer, $n_{shift}^{RA}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group. The UE also includes a cyclic shift value determining module, configured to obtain a cyclic shift value $C_v$ according to the shift serial number v by using the following formula (1):

$$C_v=d_{offset}+d_{start}\lfloor v/n_{shift}^{RA}\rfloor+(v \bmod n_{shift}^{RA})N_{CS} \quad (1),$$

where $d_{offset}$ is a shift offset, $d_{start}$ is a cyclic shift distance between neighboring groups, $n_{shift}^{RA}$ is a quantity of users that can be differentiated by one group, and $N_{CS}$ is a quantity of cyclic shifts occupied by one user. The UE also includes a random access ZC sequence generation module, configured to generate a random access ZC sequence $x_{u,C_v}(n)$ according to the cyclic shift value $C_v$ by using the following formula (14):

$$x_{u,C_v}(n)=x_u((n+C_v)\bmod N_{ZC}) \quad (14), \text{ where}$$

$N_{ZC}$ is a sequence length, and a ZC sequence whose root is u is defined as $$x_u(n) = e^{-j\frac{\pi u n(n+1)}{N_{ZC}}},$$

where $0 \le n \le N_{ZC}-1$, and $n_{shift}^{RA}$, $d_{start}$, $n_{group}^{RA}$, and $\bar{n}_{shift}^{RA}$ meet formulas (2) to (5); or $n_{shift}^{RA}$, $d_{start}$, $n_{group}^{RA}$, and $\bar{n}_{shift}^{RA}$ meet formulas (6) to (9); or $n_{shift}^{RA}$, $d_{start}$, $n_{group}^{RA}$, and $\bar{n}_{shift}^{RA}$ meet formulas (10) to (13):

$$n_{shift}^{RA}=\lfloor d_u/N_{CS} \rfloor \quad (2);$$

$$d_{start}=4d_u+n_{shift}^{RA}N_{CS} \quad (3);$$

$$n_{group}^{RA}=\lfloor N_{ZC}/d_{start} \rfloor \quad (4);$$

$$\bar{n}_{shift}^{RA}=\max(\lfloor(N_{ZC}-4d_u-n_{group}^{RA}d_{start})/N_{CS}\rfloor,0) \quad (5);$$

$$n_{shift}^{RA}=\lfloor(N_{ZC}-4d_u)/N_{CS}\rfloor \quad (6);$$

$$d_{start}=N_{ZC}-4d_u+n_{shift}^{RA}N_{CS} \quad (7);$$

$$n_{group}^{RA}=\lfloor d_u/d_{start}\rfloor \quad (8);$$

$$\bar{n}_{shift}^{RA}=\min(\max(\lfloor(d_u-n_{group}^{RA}d_{start})/N_{CS}\rfloor,0),n_{shift}^{RA}) \quad (9);$$

$$n_{shift}^{RA}=\lfloor(N_{ZC}-3d_u)/N_{CS}\rfloor \quad (10);$$

$$d_{start}=N_{ZC}-3d_u+n_{shift}^{RA}N_{CS} \quad (11);$$

$$n_{group}^{RA}=\lfloor d_u/d_{start}\rfloor \quad (12); \text{ and}$$

$$\bar{n}_{shift}^{RA}=0 \quad (13).$$

The embodiments of the present invention provide a method for generating a random access channel ZC sequence, and an apparatus. When a Doppler frequency shift of UE is greater than or equal to a first predetermined value (where the first predetermined value is greater than one time a PRACH subcarrier spacing), a base station notifies the UE that a random access set that needs to be used is a second restricted set, to instruct the UE to generate the random access ZC sequence by using the second restricted set, which resolves a problem of mutual interference between multiple UE random access sequences caused when the Doppler frequency shift is greater than one time the PRACH subcarrier spacing and less than two times the PRACH subcarrier spacing, thereby avoiding the mutual interference between the multiple UE random access sequences, and improving accuracy of decoding a random access sequence by the base station.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
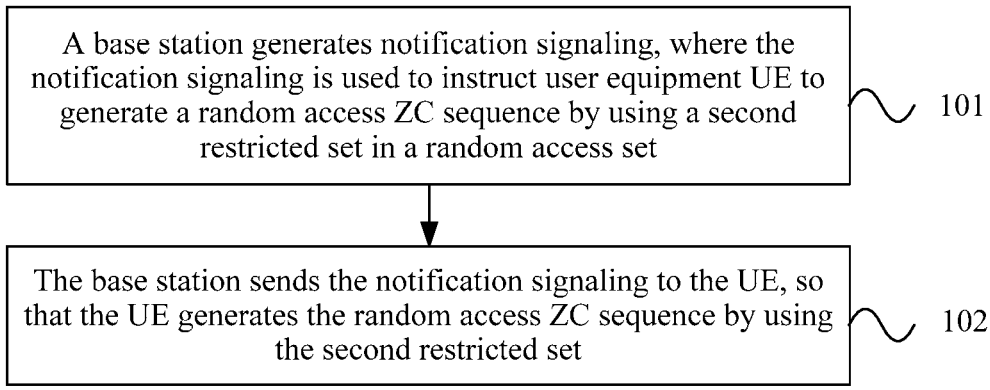
FIG. 1 is a flowchart of Embodiment 1 of a method for generating a random access channel ZC sequence according to the present invention.

FIG. 1 is a flowchart of Embodiment 1 of a method for generating a random access channel ZC sequence according to the present invention. As shown in FIG. 1, the method in this embodiment may include the following steps.

Step 101: A base station generates notification signaling, where the notification signaling is used to instruct user equipment UE to generate a random access ZC sequence by using a second restricted set in a random access set.

The random access set includes an unrestricted set, a first restricted set, and the second restricted set; and the second restricted set is a random access set that the UE needs to use when a Doppler frequency shift of the UE is greater than or equal to a first predetermined value, and the first predetermined value is greater than one time a physical random access channel PRACH subcarrier spacing.

It should be noted that: the first restricted set is a random access set that the UE needs to use when the Doppler frequency shift of the UE is greater than or equal to a second predetermined value, and the unrestricted set is a random access set that the UE needs to use when the Doppler frequency shift of the UE is less than or equal to a third predetermined value, where the second predetermined value is less than the first predetermined value, and the third predetermined value is less than the second predetermined value.

Step 102: The base station sends the notification signaling to the UE, so that the UE generates the random access ZC sequence by using the second restricted set.

In the prior art, to avoid mutual interference between multiple UE random access sequences caused by a Doppler frequency shift, an existing LTE system is dedicatedly designed, and the design is based on a premise that the Doppler frequency shift is less than one time the PRACH subcarrier spacing. In the present invention, when the Doppler frequency shift of the UE is greater than or equal to the first predetermined value (where the first predetermined value is greater than one time the PRACH subcarrier spacing), the base station notifies the UE that a random access set that needs to be used is the second restricted set, to instruct the UE to generate the random access ZC sequence by using the second restricted set.

In the prior art, to avoid mutual interference between multiple UE random access sequences caused by a Doppler frequency shift, an existing LTE system is dedicatedly designed, and the design is based on a premise that the Doppler frequency shift is less than one time the PRACH subcarrier spacing. However, as requirements for wireless communication continuously increase, when the LTE system performs communication at a higher operating frequency, a case in which the Doppler frequency shift is greater than one time the PRACH subcarrier spacing and less than two times the PRACH subcarrier spacing may occur. In the existing LTE system, when the Doppler frequency shift is greater than one time the PRACH subcarrier spacing and less than two times the PRACH subcarrier spacing, there is a problem of mutual interference between multiple UE random access sequences. In the present invention, when the Doppler frequency shift of the UE is greater than or equal to the first predetermined value (where the first predetermined value is greater than one time the PRACH subcarrier spacing), the base station notifies the UE that a random access set that needs to be used is the second restricted set, to instruct the UE to generate the random access ZC sequence by using the second restricted set, which implements dedicated design for the LTE system in the case in which the Doppler frequency shift is greater than one time the PRACH subcarrier spacing and less than two times the PRACH subcarrier spacing, thereby avoiding the mutual interference between the multiple UE random access sequences when the Doppler frequency shift is greater than one time the PRACH subcarrier spacing and less than two times the PRACH subcarrier spacing, and improving accuracy of decoding a random access sequence by the base station.

In this embodiment, when a Doppler frequency shift of UE is greater than or equal to a first predetermined value (where the first predetermined value is greater than one time a PRACH subcarrier spacing), a base station notifies the UE that a random access set that needs to be used is a second restricted set, to instruct the UE to generate the random access ZC sequence by using the second restricted set, which resolves a problem of mutual interference between multiple UE random access sequences caused when the Doppler frequency shift is greater than one time the PRACH subcarrier spacing and less than two times the PRACH subcarrier spacing, thereby avoiding the mutual interference between the multiple UE random access sequences, and improving accuracy of decoding a random access sequence by the base station.

Embodiment 2 of a method for generating a random access channel ZC sequence

Before step 101 in Embodiment 1 of the method for generating a random access channel ZC sequence shown in FIG. 1, the method may further include: obtaining, by the base station, the Doppler frequency shift of the UE; and performing step 101 if the Doppler frequency shift of the UE is greater than or equal to the first predetermined value.

The first predetermined value is greater than one time the PRACH subcarrier spacing.

For example, the first predetermined value may be 1.5 times the PRACH subcarrier spacing.

Optionally, the base station obtains a moving speed of the UE, and determines the Doppler frequency shift according to the moving speed.

Doppler frequency shift $f_D=fv/c$, where f is a carrier frequency, v is the moving speed, and c is a speed of light.

In this embodiment, a Doppler frequency shift of UE is obtained, and when the Doppler frequency shift of the UE is greater than or equal to a first predetermined value (where the first predetermined value is greater than one time a PRACH subcarrier spacing), a base station notifies the UE that a random access set that needs to be used is a second restricted set, to instruct the UE to generate the random access ZC sequence by using the second restricted set, which resolves a problem of mutual interference between multiple UE random access sequences caused when the Doppler frequency shift is greater than one time the PRACH subcarrier spacing and less than two times the PRACH subcarrier spacing, thereby avoiding the mutual interference between the multiple UE random access sequences, and improving accuracy of decoding a random access sequence by the base station.

Figure 2:
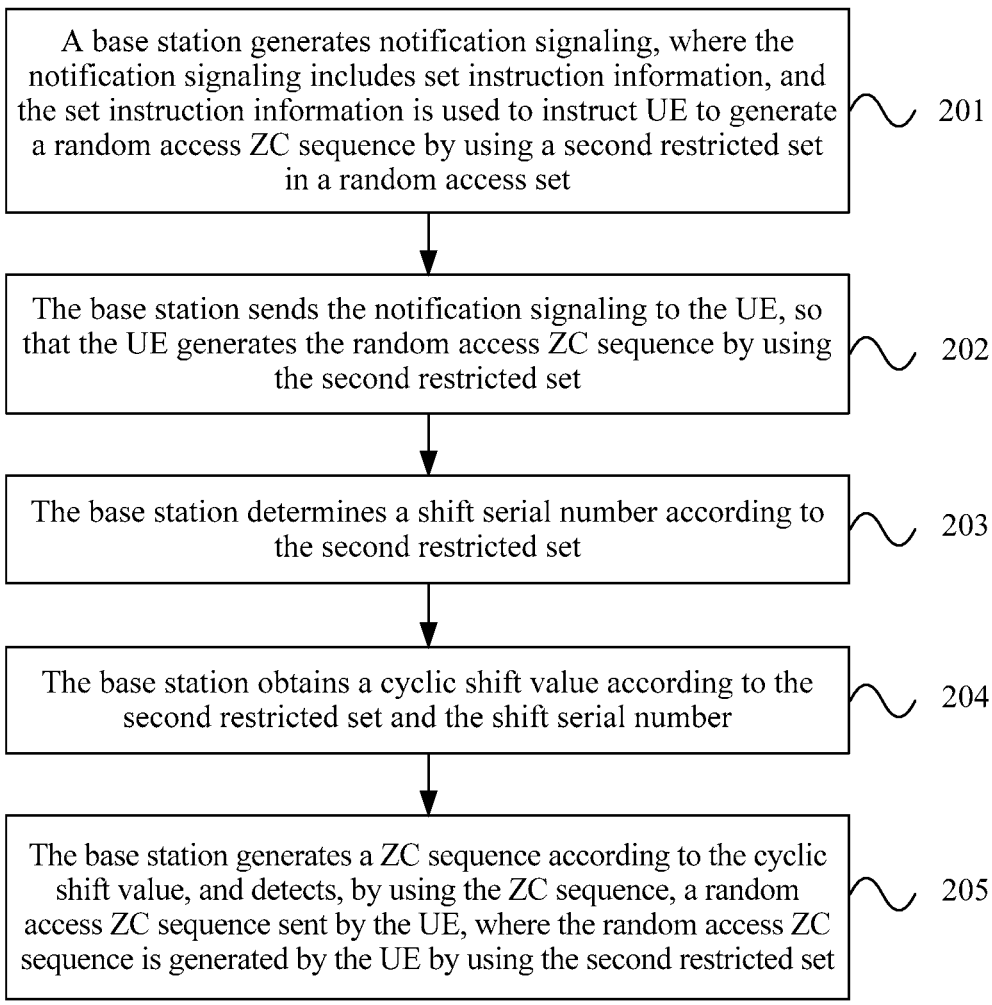
FIG. 2 is a flowchart of Embodiment 3 of a method for generating a random access channel ZC sequence according to the present invention.

FIG. 2 is a flowchart of Embodiment 3 of a method for generating a random access channel ZC sequence according to the present invention. As shown in FIG. 2, the method in this embodiment may include the following steps.

Step 201: A base station generates notification signaling, where the notification signaling includes set instruction information, and the set instruction information is used to instruct UE to generate a random access ZC sequence by using a second restricted set in a random access set.

The random access set includes an unrestricted set, a first restricted set, and the second restricted set.

The second restricted set is a random access set that the UE needs to use when a Doppler frequency shift of the UE is greater than or equal to a first predetermined value.

It should be noted that a relationship among the unrestricted set, the first restricted set, and the second restricted set is the same as that in step 101, and details are not described herein again.

Step 202: The base station sends the notification signaling to the UE, so that the UE generates the random access ZC sequence by using the second restricted set.

Step 203: The base station determines a shift serial number according to the second restricted set.

Optionally, the base station selects the shift serial number v from a range of 0 to $(n_{shift}^{RA} n_{group}^{RA} + \bar{n}_{shift}^{RA} - 1)$, where v is a positive integer, and $n_{shift}^{RA}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group.

Optionally, the base station cannot learn a shift serial number used when the UE sends a random access ZC sequence, and therefore, when detecting the random access ZC sequence sent by the UE, the base station sequentially selects and traverses all shift serial numbers in a range of 0 to $(n_{shift}^{RA} n_{group}^{RA} + \bar{n}_{shift}^{RA} - 1)$, or the base station sequentially selects and traverses all shift serial numbers in a range of 0 to X, where X is an integer less than $(n_{shift}^{RA} n_{group}^{RA} + \bar{n}_{shift}^{RA} - 1)$.

Step 204: The base station obtains a cyclic shift value according to the second restricted set and the shift serial number.

Optionally, the base station obtains a cyclic shift value $C_v$ of the UE according to the shift serial number v by using the following formula (1):

$$C_v = d_{offset} + d_{start} \lfloor v/n_{shift}^{RA} \rfloor + (v \bmod n_{shift}^{RA}) N_{CS} \qquad (1),$$

where $d_{offset}$ is a shift offset, $d_{start}$ is a cyclic shift distance between neighboring groups, v is the shift serial number, $n_{shift}^{RA}$ is a quantity of users that can be differentiated by one group, and $N_{CS}$ is a quantity of cyclic shifts occupied by one user.

It should be noted that $d_{offset}$ is an integer (which is generally a constant integer), and $d_{offset}$ used on a base station side and $d_{offset}$ used on a UE side need to be the same. Optionally, the base station side and the UE side may use $d_{offset}$ of a same value by means of agreement in advance. For example, $d_{offset}=0$.

It should be noted that, in the present invention, $\lfloor Y \rfloor$ represents rounding down Y, that is, if Y is equal to 2.5, $\lfloor Y \rfloor$ is equal to 2. For example, $\lfloor v/n_{shift}^{RA} \rfloor$ represents rounding down $v/n_{shift}^{RA}$.

It should be noted that, in the present invention, mod represents a modulo operation. For example, 4 mod 2=0, and 5 mod 2=1.

Step 205: The base station generates a ZC sequence according to the cyclic shift value, and detects, by using the ZC sequence, a random access ZC sequence sent by the UE, where the random access ZC sequence is generated by the UE by using the second restricted set.

A ZC sequence $x_u(n)$ whose root is u may be defined as $$x_u(n) = e^{-j\frac{\pi u n(n+1)}{N_{ZC}}},$$

where $0 \le n \le N_{ZC}-1$, $N_{ZC}$ is a length of the ZC sequence, and u is the root of the ZC sequence.

Specifically, the base station performs a cyclic shift on the ZC sequence $x_u(n)$ whose root is u. If a cyclic shift value is K, a ZC sequence generated according to the cyclic shift value is $x_u((n+K) \bmod N_{ZC})$, where $N_{ZC}$ is a length of the ZC sequence.

Optionally, the base station performs, by using the ZC sequence generated according to the cyclic shift value, correlation detection on the random access ZC sequence sent by the UE. Correlation detection may be performed in a time domain, or detection may be performed in a frequency domain in a frequency-domain detection manner corresponding to a time-domain correlation detection manner.

Optionally, $n_{shift}^{RA}$, $d_{start}$, $n_{group}^{RA}$, and $\bar{n}_{shift}^{RA}$ in step 203 and step 204 in this embodiment meet formulas (2) to (5):

$$n_{shift}^{RA} = \lfloor d_u/N_{CS} \rfloor \qquad (2);$$

$$d_{start} = 4d_u + n_{shift}^{RA} N_{CS} \qquad (3);$$

$$n_{group}^{RA} = \lfloor N_{ZC}/d_{start} \rfloor \qquad (4); \text{ and}$$

$$\bar{n}_{shift}^{RA} = \max(\lfloor (N_{ZC}-4d_u-n_{group}^{RA}d_{start})/N_{CS} \rfloor, 0) \qquad (5).$$

Alternatively, $n_{shift}^{RA}$, $d_{start}$, $n_{group}^{RA}$, and $\bar{n}_{shift}^{RA}$ in step 203 and step 204 in this embodiment meet formulas (6) to (9):

$$n_{shift}^{RA} = \lfloor (N_{ZC}-4d_u)/N_{CS} \rfloor \qquad (6);$$

$$d_{start} = N_{ZC}-4d_u + n_{shift}^{RA} N_{CS} \qquad (7);$$

$$n_{group}^{RA} = \lfloor d_u/d_{start} \rfloor \qquad (8); \text{ and}$$

$$\bar{n}_{shift}^{RA} = \min(\max(\lfloor (d_u-n_{group}^{RA}d_{start})/N_{CS} \rfloor, 0), n_{shift}^{RA}) \qquad (9).$$

Alternatively, $n_{shift}^{RA}$, $d_{start}$, $n_{group}^{RA}$, and $\bar{n}_{shift}^{RA}$ in step 203 and step 204 in this embodiment meet formulas (10) to (13):

$$n_{shift}^{RA} = \lfloor (N_{ZC}-3d_u)/N_{CS} \rfloor \qquad (10);$$

$$d_{start} = N_{ZC}-3d_u + n_{shift}^{RA} N_{CS} \qquad (11);$$

$$n_{group}^{RA} = \lfloor d_u/d_{start} \rfloor \quad (12); \text{ and}$$

$$\bar{n}_{shift}^{RA} = 0 \quad (13).$$

Optionally, when $N_{CS} \leq d_u < N_{ZC}/5$, $n_{shift}^{RA}$, $d_{start}$, $n_{group}^{RA}$, and $\bar{n}_{shift}^{RA}$ meet formulas (2) to (5); when $N_{ZC}/5 \leq d_u \leq (N_{ZC}-N_{CS})/4$, $n_{shift}^{RA}$, $d_{start}$, $n_{group}^{RA}$, and $\bar{n}_{shift}^{RA}$ meet formulas (6) to (9); or when $(N_{ZC}+N_{CS})/4 \leq d_u \leq (N_{ZC}-N_{CS})/3$, $n_{shift}^{RA}$, $d_{start}$, $n_{group}^{RA}$, and $\bar{n}_{shift}^{RA}$ meet formulas (10) to (13), where $d_u$ is a cyclic shift to which a ZC sequence corresponds when a Doppler frequency shift is one time a PRACH subcarrier spacing.

It should be noted that, in the present invention, max represents maximizing, for example, max(0,1)=1, and max(4,5)=5; and min represents minimizing, for example, min(0,1)=0, and min(4,5)=4.

It should be noted that, although only three different scenarios are provided herein, any $n_{shift}^{RA}$, $d_{start}$, $n_{group}^{RA}$, and $\bar{n}_{shift}^{RA}$ that meet formulas (2) to (5), or formulas (6) to (9), or formulas (10) to (13) shall fall within the protection scope of the present invention.

In this embodiment, when a Doppler frequency shift of UE is greater than or equal to a first predetermined value (where the first predetermined value is greater than one time a PRACH subcarrier spacing), a base station sends set instruction information to the UE, to instruct the UE to generate the random access ZC sequence by using a second restricted set, which resolves a problem of mutual interference between multiple UE random access sequences caused when the Doppler frequency shift is greater than one time the PRACH subcarrier spacing and less than two times the PRACH subcarrier spacing, thereby avoiding the mutual interference between the multiple UE random access sequences, and improving accuracy of decoding a random access sequence by the base station.

The following illustrates a reason why mutual interference between multiple UE random access sequences, caused when the Doppler frequency shift is greater than one time the PRACH subcarrier spacing and less than two times the PRACH subcarrier spacing, can be avoided when $n_{shift}^{RA}$, $d_{start}$, $n_{group}^{RA}$, and $\bar{n}_{shift}^{RA}$ meet formulas (2) to (5), or formulas (6) to (9), or formulas (10) to (13) in this embodiment.

It is assumed that a signal sent by the UE is $r(t)e^{j2\pi ft}$, where $r(t)$ a baseband signal, and $e^{j2\pi ft}$ is a carrier frequency. In this case, a signal obtained after a Doppler frequency shift of $m\Delta f$ is $r(t)e^{j2\pi(f+m\Delta f)t}$, where m is a positive integer, and $\Delta f$ is one time the PRACH subcarrier spacing.

According to a property of inverse fast Fourier transform (IFFT, Inverse Fast Fourier Transform), a reciprocal of a frequency-domain interval is equal to a time-domain period, which is equivalent to $$\Delta f = \frac{1}{N\Delta t},$$

where $\Delta f$ is a subcarrier spacing, $\Delta t$ is a time-domain sampling interval, and N is a value of discrete Fourier transform (DFT, Discrete Fourier Transformation) or inverse discrete Fourier transform (IDFT, Inverse Discrete Fourier Transform).

Assuming that $t=n\Delta t$, $r(t)e^{j2\pi(f+m\Delta f)t}=(r(t)e^{j2\pi(mn)/N})e^{j2\pi ft}$, where $(r(t)e^{j2\pi(mn)/N})$ is an equivalent baseband signal.

Property 1:

When the UE sends a random access ZC sequence to the base station, if there is a Doppler frequency shift of $\pm m\Delta f$ between the UE and a receive end of the base station, a random access ZC sequence received by the receive end of the base station is a shifted sequence of the random access ZC sequence sent by the UE, and there is a fixed phase offset between the two sequences.

Demonstration: A Doppler frequency shift of $-m\Delta f$ is used as an example, a baseband sampling signal in a time domain $t=n\Delta t$ is denoted as $r(n)$, and it is assumed that $N=N_{ZC}$ for an equivalent baseband signal $(r(t)e^{-j2\pi(mn)/N})$. In this case, $$r(n) = W^{\frac{un(n+1)}{2}} W^{mn},$$

where $r(n)$ represents a baseband sampling signal of an equivalent baseband signal of a ZC sequence, and $$W = e^{-j\frac{2\pi}{N_{ZC}}}.$$

$$\begin{aligned} r(n) &= W^{\frac{un(n+1)}{2}} W^{mn} \\ &= W^{\frac{u[n(n+1)+2m(1/u)n]}{2}} \\ &= W^{\frac{u[n(n+m(1/u)+1)+m(1/u)(n+m(1/u)+1)-m(1/u)(m(1/u)+1)]}{2}} \\ &= W^{\frac{u[(n+m(1/u))(n+m(1/u)+1)-m(1/u)(m(1/u)+1)]}{2}} \\ &= W^{\frac{u(n+m(1/u))(n+m(1/u)+1)}{2}} W^{\frac{-um(1/u)(m(1/u)+1)}{2}} \\ &= x_u(n+m(1/u))W, \end{aligned} \quad (15)$$

where
$x_u(n)$ represents a ZC sequence whose root is u, that is $$x_u(n) = e^{-j\frac{\pi un(n+1)}{N_{ZC}}},$$

and $x_u(n+m(1/u))$ represents a shifted sequence of the ZC sequence whose root is u, that is, a sequence obtained after a right cyclic shift of $m(1/u)$ bits is performed on the ZC sequence whose root is u.

In formula (15), $u^{-1}$ is defined as a minimum nonnegative integer that meets $((1/u) \times u) \mod N_{ZC}=1$.

It can be learned from formula (15) that $u^{-1}$ is a cyclic shift to which a ZC sequence corresponds when a Doppler frequency shift is one time the PRACH subcarrier spacing, that is, a cyclic shift length that exists between a ZC sequence received by the base station and a ZC sequence sent by the UE when the Doppler frequency shift is one time the PRACH subcarrier spacing.

For example, if a ZC sequence sent by the UE is $x_u(n)$, and a Doppler frequency shift is one time the PRACH subcarrier spacing, a ZC sequence received by the base station is $x_u((n+u^{-1}) \mod N_{ZC})$ or $x_u((n-u^{-1}) \mod N_{ZC})$.

It can be learned from formula (15) that, if there is a Doppler frequency shift of $-m\Delta f$ between the UE and the receive end of the base station, a random access ZC sequence received by the base station in a time domain is a shifted sequence of a random access ZC sequence sent by the UE, and there is a fixed phase offset $$W^{\frac{-um(1/u)(m(1/u)+1)}{2}}$$

(which is irrelevant to n) between the two sequences. Similarly, if there is a Doppler frequency shift of +mΔf, a random access ZC sequence received by the base station in a time domain is also a shifted sequence of a random access ZC sequence sent by the UE. Details are not described herein again.

Property 2: When a Doppler frequency shift is relatively large, and the Doppler frequency shift $f_{off}$ is less than one time the PRACH subcarrier spacing Δf, after correlation detection is performed on a sequence, correlation peaks may appear at three positions obtained by means of sequence shifts of $u^{-1}$, o, and $-u^{-1}$.

That is, for a ZC sequence $x_u(n)$ whose root is u, when the Doppler frequency shift $f_{off}$ is less than one time the PRACH subcarrier spacing Δf, and a random access ZC sequence sent by the UE is $x_u(n)$, a peak may appear when the receive end of the base station uses a ZC sequence $x_u(n)$, $x_u((n+u^{-1}) \bmod N_{ZC})$, or $x_u((n-u^{-1}) \bmod N_{ZC})$, to perform correlation detection on the random access ZC sequence sent by the UE.

It should be noted that Property 2 is determined by means of an experiment.

It can be learned from Property 1 and Property 2 that:

(1) When the Doppler frequency shift $f_{off}=\Delta f+x$, $0<x<\Delta f$, and the base station performs receiving, peaks may be generated at three positions obtained by means of shifts of $u^{-1}$, $-2u^{-1}$, and o.

That is, for the ZC sequence $x_u(n)$ whose root is u, when the Doppler frequency shift $f_{off}=\Delta f+x$ (where $0<x<\Delta f$), and the random access ZC sequence sent by the UE is $x_u(n)$, a peak may appear when the receive end of the base station uses a ZC sequence $x_u(n)$, $x_u((n-u^{-1}) \bmod N_{ZC})$, or $x_u((n-2u^{-1}) \bmod N_{ZC})$ to perform correlation detection on the random access ZC sequence sent by the UE.

(2) When the Doppler frequency shift $f_{off}=-\Delta f-x$, $x<\Delta f$, and the base station performs receiving, peaks may be generated at three positions obtained by means of shifts of $u^{-1}$, $-2u^{-1}$, and o.

That is, for the ZC sequence $x_u(n)$ whose root is u, when the Doppler frequency shift $f_{off}=-\Delta f-x$ (where $0<x<\Delta f$), and the random access ZC sequence sent by the UE is $x_u(n)$, a peak may appear when the receive end of the base station uses a ZC sequence $x_u(n)$, $x_u((n+u^{-1}) \bmod N_{ZC})$, or $x_u((n+2u^{-1}) \bmod N_{ZC})$ to perform correlation detection on the random access ZC sequence sent by the UE.

Therefore, when the Doppler frequency shift is greater than one time the PRACH subcarrier spacing Δf and less than two times the PRACH subcarrier spacing, and the base station performs receiving, peaks may be generated at five positions obtained by means of shifts of $-u^{-1}$, $-2u^{-1}$, o, $u^{-1}$, and $2u^{-1}$.

That is, for the ZC sequence $x_u(n)$ whose root is u, when the Doppler frequency shift is greater than one time the PRACH subcarrier spacing Δf and less than two times the PRACH subcarrier spacing, and the random access ZC sequence sent by the UE is $x_u(n)$, a peak may appear when the receive end of the base station uses a ZC sequence $x_u((n-2u^{-1}) \bmod N_{ZC})$, $x_u((n-u^{-1}) \bmod N_{ZC})$, $x_u(n)$, $x_u((n+u^{-1}) \bmod N_{ZC})$, or $x_u((n+2u^{-1}) \bmod N_{ZC})$ to perform correlation detection on the random access ZC sequence sent by the UE.

In this embodiment, that $n_{shift}^{RA}$, $d_{start}$, $n_{group}^{RA}$, and $\bar{n}_{shift}^{RA}$ meet formulas (2) to (5), formulas (6) to (9), or formulas (10) to 13 is intended to prevent ZC sequences, corresponding to five peak points generated by the receive end of the base station when the Doppler frequency shift is greater than one time the PRACH subcarrier spacing and less than two times the PRACH subcarrier spacing, from being allocated to another user, thereby avoiding interference between users caused by a Doppler frequency shift.

In the present invention, $d_u=u^{-1}$, that is, $d_u$ is a cyclic shift to which a ZC sequence corresponds when a Doppler frequency shift is one time the PRACH subcarrier spacing.

Figure 3:
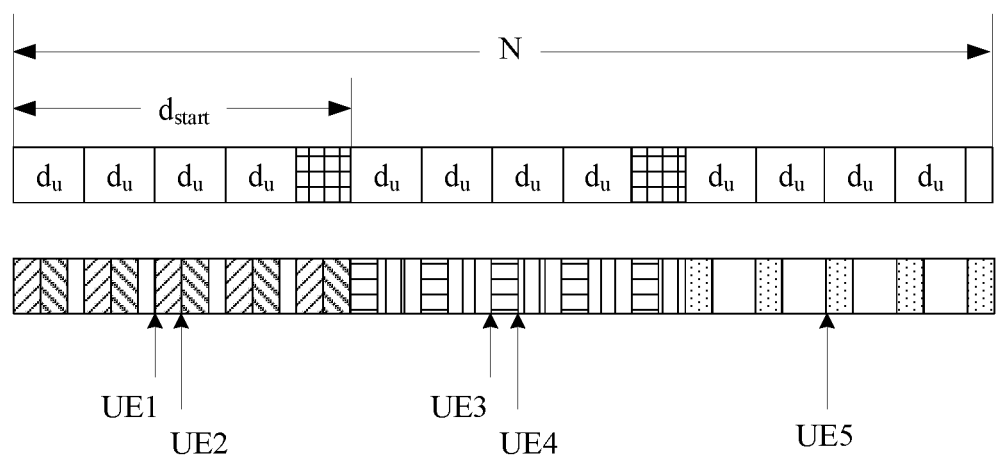
FIG. 3 is a schematic structural diagram of Scenario 1 according to an embodiment of the present invention.

FIG. 3 is a schematic structural diagram of Scenario 1 according to an embodiment of the present invention. In the figure, $N=N_{ZC}$, and $N_{CS} \leq d_u < N_{ZC}/5$. As shown in FIG. 3, sequence shifts represented by slashes and backslashes are used as a first group, and sequence shifts represented by horizontal lines and vertical lines are used as a second group. $n_{shift}^{RA} = \lfloor d_u/N_{CS} \rfloor$, where $n_{shift}^{RA}$ represents a quantity of candidate sequence shifts of UE in one group, and $N_{CS}$ represents a quantity of cyclic shifts occupied by one user. For example, a sequence length is $N_{ZC}$, one user occupies $N_{CS}$ shifts, and when a Doppler frequency shift is not considered, a maximum of $\lfloor N_{ZC}/N_{CS} \rfloor$ users are allowed to send random access signals at the same time. As shown in FIG. 3, a quantity of candidate sequence shifts of UE in the first group is 2, where the slashes correspond to one candidate sequence shift of UE, and the backslashes correspond to the other candidate sequence shift of UE; and a quantity of candidate sequence shifts of UE in the second group is 2, where the horizontal lines correspond to one candidate sequence shift of UE, and the vertical lines correspond to the other candidate sequence shift of UE.

$n_{shift}^{RA}$ may represent a quantity of users that can be differentiated by one group. From a perspective of an entire system, $n_{shift}^{RA}$ users can be differentiated by one group, and from a perspective of a UE side, a maximum of $n_{shift}^{RA}$ sequence shifts in one group are available to one UE for selection.

It should be noted that: for a ZC sequence whose sequence length is $N_{ZC}$, when a Doppler frequency shift is not considered, and $N_{CS}=0$, the ZC sequence may include $N_{ZC}$ candidate sequence shifts, which are corresponding to cyclic shift values 0 to $N_{ZC}-1$ respectively. For example, if a ZC sequence whose root is u is denoted as $x_u(n)$, when a cyclic shift value is 0, a ZC sequence generated by using the ZC sequence whose root is u is $x_u(n)$; and when a cyclic shift value is 1, a ZC sequence generated by using the ZC sequence whose root is u is $x_u(n+1)$. When a Doppler frequency shift is not considered, and $N_{CS}$ is greater than 0, there may be $\lfloor N_{ZC}/N_{CS} \rfloor$ candidate sequence shifts, which are corresponding to $Y*N_{CS}$ cyclic shift values respectively, where Y is an integer greater than or equal to 0 and less than $\lfloor N_{ZC}/N_{CS} \rfloor - 1$.

When a Doppler frequency shift is greater than one time a PRACH subcarrier spacing and less than two times the PRACH subcarrier spacing, first user equipment generates a random access ZC sequence by using a first cyclic shift value, and sends the random access ZC sequence to a base station. Therefore, a peak may appear when the base station uses ZC sequences corresponding to five cyclic shift values to detect the random access ZC sequence sent by the first user equipment, and differences between these cyclic shift values and the first cyclic shift value are 0, $d_u$, $-d_u$, $2d_u$, and $-2d_u$, respectively. To avoid interference between the first user equipment and another user equipment, all candidate sequence shifts corresponding to the five cyclic shift values can no longer be allocated to the another user equipment, which, for a base station side, is also equivalent to that all the candidate sequence shifts corresponding to the five cyclic shift values are allocated to the first user equipment. That is, as shown in FIG. 3, five candidate sequence shifts whose fill patterns are slashes are allocated to UE1 as one new candidate sequence shift (where the five candidate sequence shifts may be referred to as sub candidate sequence shifts of the new candidate sequence shift), five candidate sequence shifts whose fill patterns are backslashes are allocated to UE2 as one new candidate sequence shift, five candidate sequence shifts whose fill patterns are horizontal lines are allocated to UE3 as one new candidate sequence shift, and five candidate sequence shifts whose fill patterns are vertical lines are allocated to UE4 as one new candidate sequence shift.

In addition, because the differences between the five cyclic shift values and the first cyclic shift value are 0, $d_u$, $-d_u$, $2d_u$, and $-2d_u$, respectively, it can also be learned that: for the UE1, a cyclic shift value used for generating a random access ZC sequence is a cyclic shift value corresponding to a position that is indicated by an arrow corresponding to the UE1 in FIG. 3; for the UE2, a cyclic shift value used for generating a random access ZC sequence is a cyclic shift value corresponding to a position that is indicated by an arrow corresponding to the UE2 in FIG. 3; for the UE3, a cyclic shift value used for generating a random access ZC sequence is a cyclic shift value corresponding to a position that is indicated by an arrow corresponding to the UE3 in FIG. 3; and for the UE4, a cyclic shift value used for generating a random access ZC sequence is a cyclic shift value corresponding to a position that is indicated by an arrow corresponding to the UE4 in FIG. 3.

$d_{start}=4d_u+n_{shift}^{RA}N_{CS}$ represents a cyclic shift distance between neighboring groups, where $n_{shift}^{RA}N_{CS}$ corresponds to a part whose fill pattern is a grid pattern in FIG. 3.

$n_{group}^{RA}=\lfloor N_{ZC}/d_{start}\rfloor$ represents a quantity of groups in a sequence whose sequence length is $N_{ZC}$. As shown in FIG. 3, a quantity of groups is 2.

$\bar{n}_{shift}^{RA}=\max(\lfloor (N_{ZC}-4d_u-n_{group}^{RA}d_{start})/N_{CS}\rfloor,0)$ represents a quantity of candidate sequence shifts of UE within a last length that is insufficient for one group. As shown in FIG. 3, a quantity of candidate sequence shifts of UE within a last length that is insufficient for one group is 1, that is, five candidate sequence shifts whose fill patterns are dot patterns are allocated to UE5 as one new candidate sequence shift.

It should be noted that FIG. 3 provides only one example of a scenario in which $N_{CS}\leq d_u<N_{ZC}/5$. For other $N_{CS}$, $d_u$, and $N_{ZC}$ that meet this scenario, a principle in which $n_{shift}^{RA}$, $d_{start}$, $n_{group}^{RA}$, and $\bar{n}_{shift}^{RA}$ meet formulas (2) to (5) is the same as a principle in the example provided in FIG. 3.

Example 1 (Referring to FIG. 3)

For example, $N_{ZC}=70$, $N_{CS}=2$, and $d_u=5$.

(1) According to $n_{shift}^{RA}=\lfloor d_u/N_{CS}\rfloor$, it can be learned that $n_{shift}^{RA}=2$, that is, a quantity of candidate sequence shifts of UE in one group is 2, that is, two users can be differentiated by one group.

(2) According to $d_{start}=4d_u+n_{shift}^{RA}N_{CS}$, it can be learned that $d_{start}=24$, that is, a cyclic shift distance between neighboring groups is 24.

(3) According to $n_{group}^{RA}=\lfloor N_{ZC}/d_{start}\rfloor$, it can be learned that $n_{group}^{RA}=2$, that is, a quantity of groups is 2.

(4) According to $\bar{n}_{shift}^{RA}=\max(\lfloor (N_{ZC}-4d_u-n_{group}^{RA}d_{start})/N_{CS}\rfloor,0)$, it can be learned that $\bar{n}_{shift}^{RA}=1$, that is, a quantity of candidate sequence shifts of UE within a last length that is insufficient for one group is 1, that is, one user can be further differentiated within the last length that is insufficient for one group.

(5) A shift serial number v is selected from a range of 0 to $(n_{shift}^{RA}n_{group}^{RA}+\bar{n}_{shift}^{RA}-1)$, and a value range of v is from 0 to 4.

(6) According to formula $C_v=d_{offset}+d_{start}\lfloor v/n_{shift}^{RA}\rfloor+(v \mod n_{shift}^{RA})N_{CS}$, when it is agreed on a base station side and a UE side that $d_{offset}=2d_u$, cyclic shift values obtained according to shift serial numbers may be 10, 12, 34, 36, and 58 (that is, positions indicated by arrows corresponding to five UEs in FIG. 3) It should be noted that when it is agreed on the base station side and the UE side that $d_{offset}$ is another value, corresponding cyclic shift values may change.

(7) If a cyclic shift is performed on a ZC sequence $x_u(n)$ whose root is u according to the cyclic shift value 10, a ZC sequence $x_u((n+10)\mod 70)$ is obtained; if a cyclic shift is performed on the ZC sequence $x_u(n)$ whose root is u according to the cyclic shift value 12, a ZC sequence $x_u((n+12)\mod 70)$ is obtained; if a cyclic shift is performed on the ZC sequence $x_u(n)$ whose root is u according to the cyclic shift value 34, a ZC sequence $x_u((n+34)\mod 70)$ is obtained; if a cyclic shift is performed on the ZC sequence $x_u(n)$ whose root is u according to the cyclic shift value 36, a ZC sequence $x_u((n+36)\mod 70)$ is obtained; and if a cyclic shift is performed on the ZC sequence $x_u(n)$ whose root is u according to the cyclic shift value 58, a ZC sequence $x_u((n+58)\mod 70)$ is obtained. It should be noted that, for the UE side, a sequence obtained by means of a cyclic shift is a random access ZC sequence.

Figure 4:
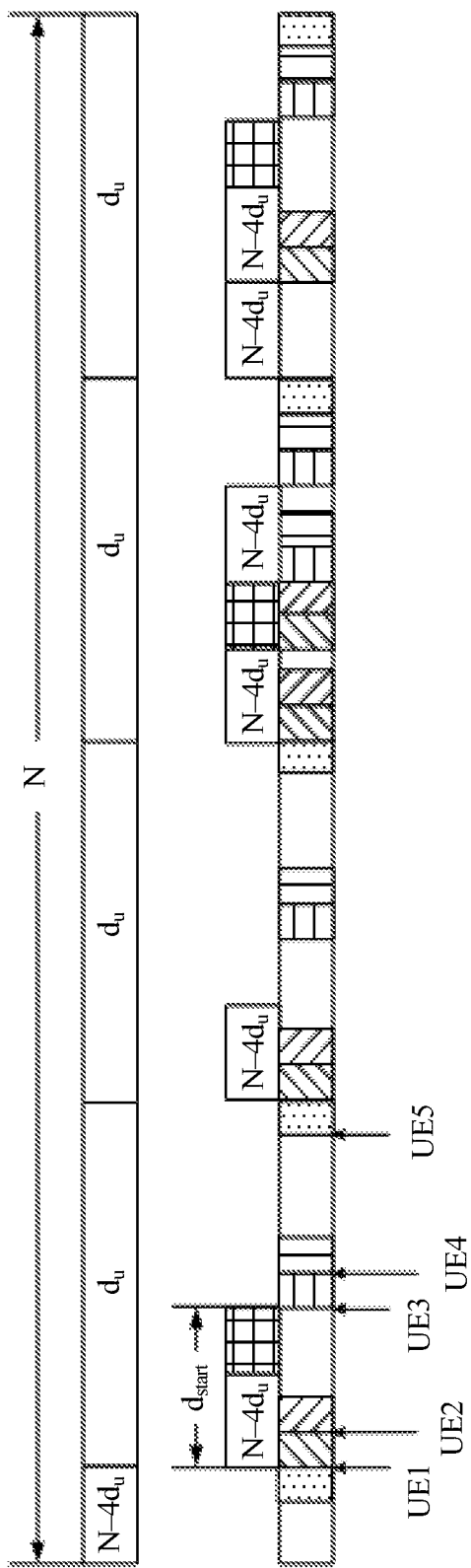
FIG. 4 is a schematic structural diagram of Scenario 2 according to an embodiment of the present invention.

FIG. 4 is a schematic structural diagram of Scenario 2 according to an embodiment of the present invention. In the figure, $N=N_{ZC}$, and $N_{ZC}/5 \leq d_u \leq (N_{ZC}-N_{CS})/4$. As shown in FIG. 4, sequence shifts represented by slashes and backslashes are used as a first group, and sequence shifts represented by horizontal lines and vertical lines are used as a second group. $n_{shift}^{RA}=\lfloor (N_{ZC}-4d_u)/N_{CS}\rfloor$, where $n_{shift}^{RA}$ represents a quantity of candidate sequence shifts of UE in one group, and $N_{CS}$ represents a quantity of cyclic shifts occupied by one user. For example, a sequence length is $N_{ZC}$, one user occupies $N_{CS}$ shifts, and when a Doppler frequency shift is not considered, a maximum of $\lfloor N_{ZC}/N_{CS}\rfloor$ users are allowed to send random access signals at the same time. As shown in FIG. 4, a quantity of candidate sequence shifts of UE in the first group is 2, where the slashes correspond to one candidate sequence shift of UE, and the backslashes correspond to the other candidate sequence shift of UE; and a quantity of candidate sequence shifts of UE in the second group is 2, where the horizontal lines correspond to one candidate sequence shift of UE, and the vertical lines correspond to the other candidate sequence shift of UE.

$n_{shift}^{RA}$ may represent a quantity of users that can be differentiated by one group. From a perspective of an entire system, $n_{shift}^{RA}$ users can be differentiated by one group, and from a perspective of a UE side, a maximum of $n_{shift}^{RA}$ sequence shifts in one group are available to one UE for selection.

It should be noted that $n_{shift}^{RA}$, $d_{start}$, $n_{group}^{RA}$, and $\bar{n}_{shift}^{RA}$ in FIG. 4 have same physical meanings as those in FIG. 3, except that $n_{shift}^{RA}$, $d_{start}$, $n_{group}^{RA}$, and $\bar{n}_{shift}^{RA}$ in FIG. 4 need to meet different formulas. An analysis process is similar to that in FIG. 3, and details are not described herein again.

$d_{start}=N_{ZC}-4d_u+n_{shift}^{RA}N_{CS}$ represents a cyclic shift distance between neighboring groups.

$n_{group}^{RA}=\lfloor d_u/d_{start}\rfloor$ represents a quantity of groups in a sequence whose sequence length is $N_{ZC}$. As shown in FIG. 4, a quantity of groups is 2.

$\bar{n}_{shift}^{RA}=\min(\max(\lfloor (d_u-n_{group}^{RA}d_{start})/N_{CS}\rfloor,0),n_{shift}^{RA})$ represents a quantity of candidate sequence shifts of UE within a last length that is insufficient for one group. As shown in FIG. 4, a quantity of candidate sequence shifts of UE within a last length that is insufficient for one group is 1, that is, five candidate sequence shifts whose fill patterns are dot patterns are allocated to UE5 as one new candidate sequence shift.

It should be noted that a part with a grid fill pattern in FIG. 4 is used to synchronously represent a part occupied by a corresponding group whose fill pattern is slashes and backslashes, to facilitate description of how to allocate each group.

It should be noted that FIG. 4 provides only one example of a scenario in which $N_{ZC}/5 \leq d_u \leq (N_{ZC}-N_{CS})/4$. For other $N_{CS}$, $d_u$, and $N_{ZC}$ that meet this scenario, a principle in which $n_{shift}^{RA}$, $d_{start}$, $n_{group}^{RA}$, and $\bar{n}_{shift}^{RA}$ need to meet formulas (6) to (9) is the same as a principle in the example provided in FIG. 4.

Example 2 (Referring to FIG. 4)

For example, $N_{ZC}=85$, $N_{CS}=2$, and $d_u=20$.

(1) According to $n_{shift}^{RA}=\lfloor (N_{ZC}-4d_u)/N_{CS} \rfloor$, it can be learned that $n_{shift}^{RA}=2$, that is, a quantity of candidate sequence shifts of UE in one group is 2, that is, two users can be differentiated by one group.

(2) According to $d_{start}=N_{ZC}-4d_u+n_{shift}^{RA}N_{CS}$, it can be learned that $d_{start}=9$, that is, a cyclic shift distance between neighboring groups is 9.

(3) According to $n_{group}^{RA}=\lfloor d_u/d_{start} \rfloor$, it can be learned that $n_{group}^{RA}=2$, that is, a quantity of groups is 2.

(4) According to $\bar{n}_{shift}^{RA}=\min(\max(\lfloor (d_u-n_{group}^{RA}d_{start})/N_{CS} \rfloor, 0), n_{shift}^{RA})$, it can be learned that $\bar{n}_{shift}^{RA}=1$, that is, a quantity of candidate sequence shifts of UE within a last length that is insufficient for one group is 1, that is, one user can be further differentiated within the last length that is insufficient for one group.

(5) A shift serial number v is selected from a range of 0 to $(n_{shift}^{RA}n_{group}^{RA}+\bar{n}_{shift}^{RA}-1)$, and a value range of v is from 0 to 4.

(6) According to formula $C_v=d_{offset}+d_{start}\lfloor v/n_{shift}^{RA} \rfloor + (v \mod n_{shift}^{RA})N_{CS}$, when it is agreed on a base station side and a UE side that $d_{offset}=5$, cyclic shift values obtained according to shift serial numbers may be 5, 7, 14, 16, and 23 (that is, positions indicated by arrows corresponding to five UEs in FIG. 4) It should be noted that when it is agreed on the base station side and the UE side that $d_{offset}$ is another value, corresponding cyclic shift values may change.

(7) If a cyclic shift is performed on a ZC sequence $x_u(n)$ whose root is u according to the cyclic shift value 5, a ZC sequence $x_u((n+5) \mod 85)$ is obtained; if a cyclic shift is performed on the ZC sequence $x_u(n)$ whose root is u according to the cyclic shift value 7, a ZC sequence $x_u((n+7) \mod 85)$ is obtained; if a cyclic shift is performed on the ZC sequence $x_u(n)$ whose root is u according to the cyclic shift value 14, a ZC sequence $x_u((n+14) \mod 85)$ is obtained; if a cyclic shift is performed on the ZC sequence $x_u(n)$ whose root is u according to the cyclic shift value 16, a ZC sequence $x_u((n+16) \mod 85)$ is obtained; and if a cyclic shift is performed on the ZC sequence $x_u(n)$ whose root is u according to the cyclic shift value 23, a ZC sequence $x_u((n+23) \mod 85)$ is obtained. It should be noted that, for the UE side, a ZC sequence obtained according to a cyclic shift value is a random access ZC sequence.

Figure 5A:
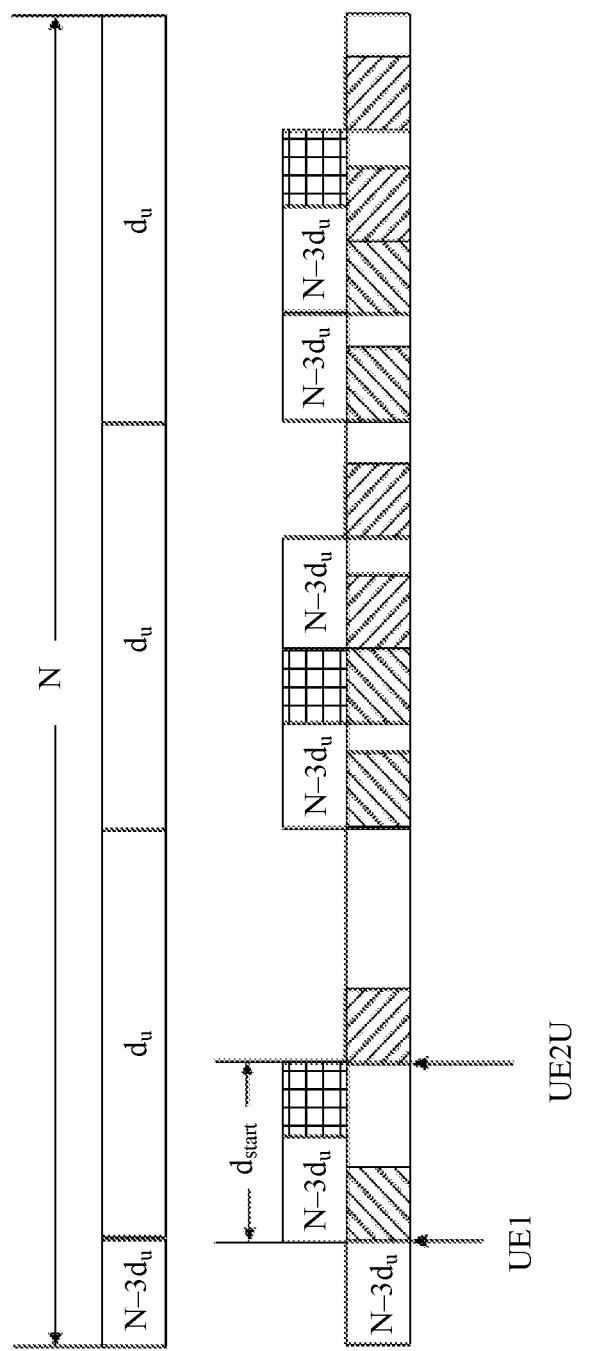
FIG. 5A is a first schematic structural diagram of Scenario 3 according to an embodiment of the present invention.

FIG. 5A is a first schematic structural diagram of Scenario 3 according to an embodiment of the present invention. In the figure, $N=N_{ZC}$, and $(N_{ZC}+N_{CS})/4 \leq d_u \leq (N_{ZC}-N_{CS})/3$. As shown in FIG. 5A, sequence shifts represented by slashes are used as a first group, and sequence shifts represented by backslashes are used as a second group.

$n_{shift}^{RA}=\lfloor (N_{ZC}-3d_u)/N_{CS} \rfloor$, where $n_{shift}^{RA}$ represents a quantity of candidate sequence shifts of UE in one group, and $N_{ZC}$ represents a quantity of cyclic shifts occupied by one user. For example, a sequence length is $N_{ZC}$, one user occupies $N_{CS}$ shifts, and when a Doppler frequency shift is not considered, a maximum of $\lfloor N_{ZC}/N_{CS} \rfloor$ users are allowed to send random access signals at the same time. As shown in FIG. 5A, a quantity of candidate sequence shifts of UE in the first group is 1, where the slashes correspond to one candidate sequence shift of UE; and a quantity of candidate sequence shift of UE in the second group is 1, where the backslashes correspond to one candidate sequence shift of UE.

$n_{shift}^{RA}$ may represent a quantity of users that can be differentiated by one group. From a perspective of an entire system, $n_{shift}^{RA}$ users can be differentiated by one group, and from a perspective of a UE side, a maximum of $n_{shift}^{RA}$ sequence shifts in one group are available to one UE for selection.

It should be noted that $n_{shift}^{RA}$, $d_{start}$, $n_{group}^{RA}$, and $\bar{n}_{shift}^{RA}$ in FIG. 5A have same physical meanings as those in FIG. 3, except that $n_{shift}^{RA}$, $d_{start}$, $n_{group}^{RA}$, and $\bar{n}_{shift}^{RA}$ in FIG. 5A need to meet different formulas. An analysis process is similar to that in FIG. 3, and details are not described herein again.

$d_{start}=N_{ZC}-3d_u+n_{shift}^{RA}N_{CS}$ represents a cyclic shift distance between neighboring groups.

$n_{group}^{RA}=\lfloor d_u/d_{start} \rfloor$ represents a quantity of groups in a sequence whose sequence length is $N_{ZC}$. As shown in FIG. 5A, a quantity of groups is 2.

$\bar{n}_{shift}^{RA}=0$ indicates that no candidate sequence shift can be allocated to another user equipment within a last length that is insufficient for one group.

It should be noted that a part with a grid fill pattern in FIG. 5A is used to synchronously represent a part occupied by a corresponding group whose fill pattern is slashes, to facilitate description of how to allocate each group.

It should be noted that FIG. 5A provides only one example of a scenario in which $(N_{ZC}+N_{CS})/4 \leq d_u \leq (N_{ZC}-N_{CS})/3$. For other $N_{CS}$, $d_u$, and $N_{ZC}$ that meet this scenario, a principle in which $n_{shift}^{RA}$, $d_{start}$, $n_{group}^{RA}$, and $\bar{n}_{shift}^{RA}$ need to meet formulas (10) to (13) is the same as a principle in the example provided in FIG. 5A.

Example 3 (Referring to FIG. 5A)

For example, $N_{ZC}=33$, $N_{CS}=2$, and $d_u=10$.

(1) According to $n_{shift}^{RA}=\lfloor (N_{ZC}-3d_u)/N_{CS} \rfloor$, it can be learned that $n_{shift}^{RA}$, that is, a quantity of candidate sequence shifts of UE in one group is 1, that is, one user can be differentiated by one group.

(2) According to $d_{start}=N_{ZC}-3d_u+n_{shift}^{RA}N_{CS}$, it can be learned that $d_{start}=5$, that is, a cyclic shift distance between neighboring groups is 5.

(3) According to $n_{group}^{RA}=\lfloor d_u/d_{start} \rfloor$, it can be learned that $n_{group}^{RA}=2$, that is, a quantity of groups is 2.

(4) $\bar{n}_{shift}^{RA}=0$.

(5) A shift serial number v is selected from a range of 0 to $(n_{shift}^{RA}n_{group}^{RA}+\bar{n}_{shift}^{RA}-1)$, and a value range of v is from 0 to 1.

(6) According to $C_v=d_{offset}+d_{start}\lfloor v/n_{shift}^{RA} \rfloor + (v \mod n_{shift}^{RA})N_{CS}$, when it is agreed on a base station side and a UE side that $d_{offset}=3$, cyclic shift values obtained according to shift serial numbers may be 3 and 8 (that is, positions indicated by arrows corresponding to two UEs in FIG. 5A). It should be noted that when it is agreed on the base station side and the UE side that $d_{offset}$ is another value, corresponding cyclic shift values may change.

(7) If a cyclic shift is performed on a ZC sequence $x_u(n)$ whose root is u according to the cyclic shift value 3, a ZC sequence $x_u((n+3) \mod 33)$ is obtained; and if a cyclic shift is performed on the ZC sequence $x_u(n)$ whose root is u according to the cyclic shift value 8, a ZC sequence $x_u((n+8) \mod 33)$ is obtained. It should be noted that, for the UE side, a ZC sequence obtained according to a cyclic shift value is a random access ZC sequence.

Figure 5B:
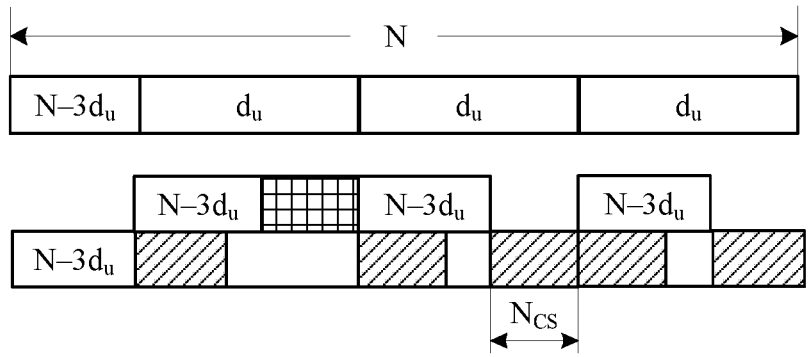
FIG. 5B is a second schematic structural diagram of Scenario 3 according to an embodiment of the present invention.

FIG. 5B is a second schematic structural diagram of Scenario 3 according to an embodiment of the present invention. As shown in FIG. 5B, when $3d_u < N_{ZC} < 4d_u$, a candidate shift sequence can be allocated to at least one UE only when a condition that $d_u \geq N_{ZC} - 3d_u + N_{CS}$ is met. That is, $$d_u \geq \frac{N_{zc} + N_{cs}}{4}$$

is a condition that must be met so that a candidate shift sequence can be allocated to UE.

It should be noted that when $(N_{ZC} - N_{CS})/4 \leq d_u \leq (N_{ZC} + N_{CS})/4$, a case in which two sub candidate sequence shifts in a candidate sequence shift allocated to one UE partially (or completely) overlap may occur, and overlapping of sub candidate sequence shifts of a same UE may degrade performance of performing frequency offset estimation and synchronization on an uplink channel by a base station. Therefore, when $(N_{ZC} - N_{CS})/4 \leq d_u \leq (N_{ZC} + N_{CS})/4$, a candidate sequence shift cannot be allocated to any UE.

It should be noted that, in the present invention, $N_{CS}$ shifts are required for detecting one peak by the base station, one sub candidate sequence shift includes $N_{CS}$ shift positions, and one candidate sequence shift allocated to UE includes $5N_{CS}$ shift positions.

Figure 6:
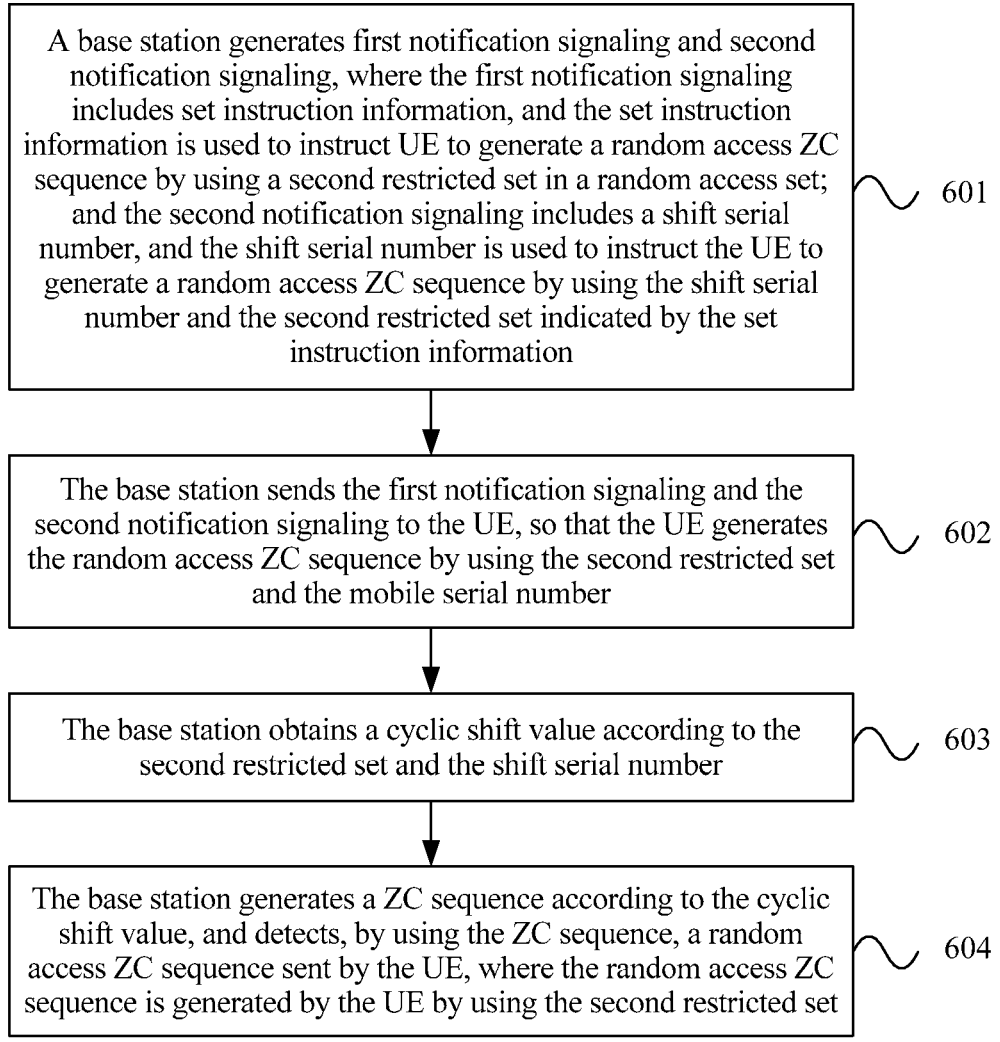
FIG. 6 is a flowchart of Embodiment 4 of a method for generating a random access channel ZC sequence according to the present invention.

FIG. 6 is a flowchart of Embodiment 4 of a method for generating a random access channel ZC sequence according to the present invention. As shown in FIG. 6, the method in this embodiment may include the following steps.

Step 601: The base station generates first notification signaling and second notification signaling, where the first notification signaling includes set instruction information, and the set instruction information is used to instruct UE to generate a random access ZC sequence by using a second restricted set in a random access set; and the second notification signaling includes a shift serial number, and the shift serial number is used to instruct the UE to generate the random access ZC sequence by using the shift serial number and the second restricted set indicated by the set instruction information.

The random access set includes an unrestricted set, a first restricted set, and the second restricted set.

The second restricted set is a random access set that the UE needs to use when a Doppler frequency shift of the UE is greater than or equal to a first predetermined value.

Optionally, before the base station generates the second notification signaling, the method may further include: determining, by the base station, the shift serial number according to the second restricted set, so that the base station generates the second notification signaling according to the shift serial number.

Specifically, the obtaining, by the base station, the shift serial number according to the second restricted set includes: selecting, by the base station, the shift serial number v from a range of 0 to $(n_{shift}^{RA} n_{group}^{RA} + \bar{n}_{shift}^{RA} - 1)$, where v is a positive integer, $n_{shift}^{RA}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group.

It should be noted that a relationship among the unrestricted set, the first restricted set, and the second restricted set is the same as that in step 101, and details are not described herein again.

It should be noted that, in this step, the base station may send the set instruction information and the shift serial number to the UE by using a piece of signaling.

Step 602: The base station sends the first notification signaling and the second notification signaling to the UE, so that the UE generates the random access ZC sequence by using the second restricted set and the mobile serial number.

Step 603: The base station obtains a cyclic shift value according to the second restricted set and the shift serial number.

A method for obtaining the cyclic shift value by the base station according to the shift serial number is the same as that in step 206, and details are not described herein again.

It should be noted that: in step 601, the base station sends the shift serial number to the UE, so that the UE generates the random access ZC sequence by using the shift serial number and the second restricted set. Therefore, in comparison with step 203, in this embodiment, when receiving a random access ZC sequence sent by the UE, the base station no long needs to traverse all shift serial numbers for detection, but directly uses the shift serial number, sent to the UE in the second notification signaling, for detection.

Step 604: The base station generates a ZC sequence according to the cyclic shift value, and detects, by using the ZC sequence, a random access ZC sequence sent by the UE, where the random access ZC sequence is generated by the UE by using the second restricted set.

Step 604 is the same as step 205, and details are not described herein again.

Specific descriptions about $n_{shift}^{RA}$, $d_{start}$, $n_{group}^{RA}$, and $\bar{n}_{shift}^{RA}$ in this embodiment are the same as those in Embodiment 3 of the method for generating a random access channel ZC sequence, and details are not described herein again.

In this embodiment, when a Doppler frequency shift of UE is greater than or equal to a first predetermined value (where the first predetermined value is greater than one time a PRACH subcarrier spacing), a base station sends set instruction information and a shift serial number to the UE, to instruct the UE to generate the random access ZC sequence by using a second restricted set and the shift serial number, which resolves a problem of mutual interference between multiple UE random access sequences caused when the Doppler frequency shift is greater than one time the PRACH subcarrier spacing and less than two times the PRACH subcarrier spacing, thereby avoiding the mutual interference between the multiple UE random access sequences, and improving accuracy of decoding a random access sequence by the base station.

Figure 7:
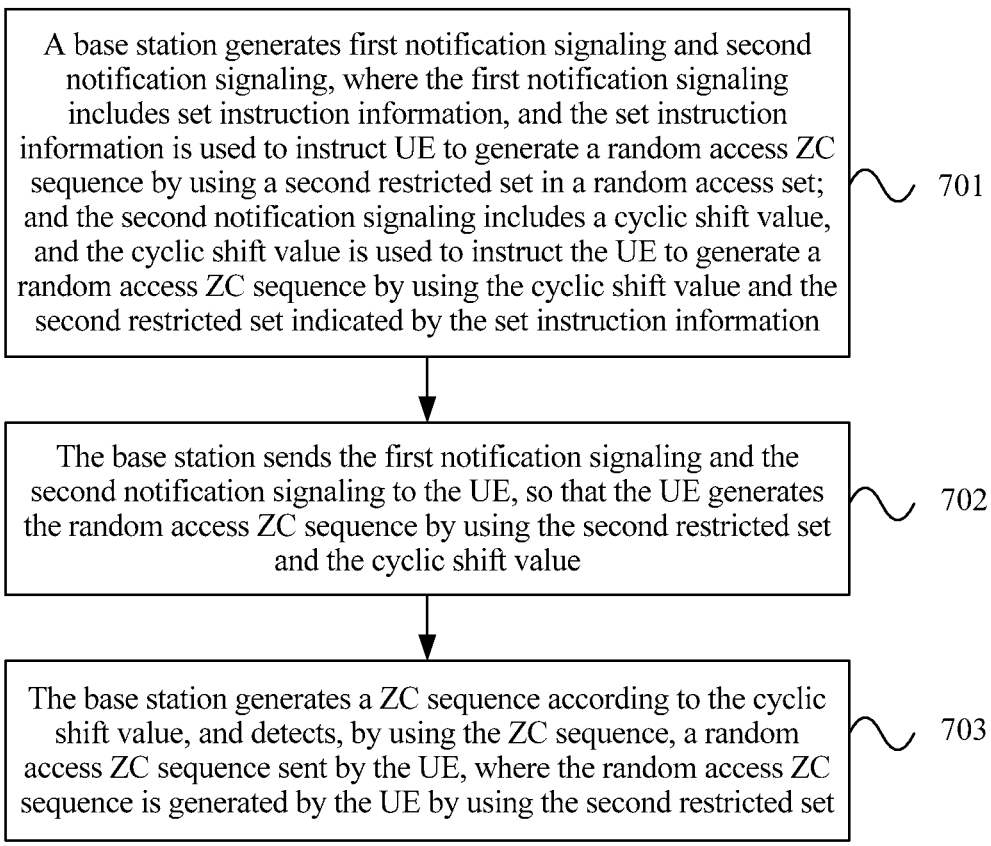
FIG. 7 is a flowchart of Embodiment 5 of a method for generating a random access channel ZC sequence according to the present invention.

FIG. 7 is a flowchart of Embodiment 5 of a method for generating a random access channel ZC sequence according to the present invention. As shown in FIG. 7, the method in this embodiment may include the following steps.

Step 701: The base station generates first notification signaling and second notification signaling, where the first notification signaling includes set instruction information, and the set instruction information is used to instruct UE to generate a random access ZC sequence by using a second restricted set in a random access set; and the second notification signaling includes a cyclic shift value, and the cyclic shift value is used to instruct the UE to generate the random access ZC sequence by using the cyclic shift value and the second restricted set indicated by the set instruction information.

The random access set includes an unrestricted set, a first restricted set, and the second restricted set.

The second restricted set is a random access set that the UE needs to use when a Doppler frequency shift of the UE is greater than or equal to a first predetermined value.

Optionally, before the base station generates the second notification signaling, the method may further include: first selecting, by the base station, a shift serial number v from a range of 0 to $(n_{shift}^{RA} n_{group}^{RA} + \bar{n}_{shift}^{RA} - 1)$, where v is a positive integer, $n_{shift}^{RA}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group; and then, obtaining, by the base station, a cyclic shift value $C_v$ of the UE according to the shift serial number v by using formula (1), so that the base station generates the second notification signaling according to the cyclic shift value.

It should be noted that a relationship among the unrestricted set, the first restricted set, and the second restricted set is the same as that in step 101, and details are not described herein again.

It should be noted that, in this step, the base station may send the set instruction information and the cyclic shift value to the UE by using a piece of signaling.

Step 702: The base station sends the first notification signaling and the second notification signaling to the UE, so that the UE generates the random access ZC sequence by using the second restricted set and the cyclic shift value.

Step 703: The base station generates a ZC sequence according to the cyclic shift value, and detects, by using the ZC sequence, a random access ZC sequence sent by the UE, where the random access ZC sequence is generated by the UE by using the second restricted set.

Step 703 is the same as step 205, and details are not described herein again.

Specific descriptions about $n_{shift}^{RA}$, $d_{start}$, $n_{group}^{RA}$, and $\bar{n}_{shift}^{RA}$ in this embodiment are the same as those in Embodiment 3 of the method for generating a random access channel ZC sequence, and details are not described herein again.

In this embodiment, when a Doppler frequency shift of UE is greater than or equal to a first predetermined value (where the first predetermined value is greater than one time a PRACH subcarrier spacing), a base station sends set instruction information and a cyclic shift value to the UE, to instruct the UE to generate the random access ZC sequence by using a second restricted set and the cyclic shift value, which resolves a problem of mutual interference between multiple UE random access sequences caused when the Doppler frequency shift is greater than one time the PRACH subcarrier spacing and less than two times the PRACH subcarrier spacing, thereby avoiding the mutual interference between the multiple UE random access sequences, and improving accuracy of decoding a random access sequence by the base station.

Figure 8:
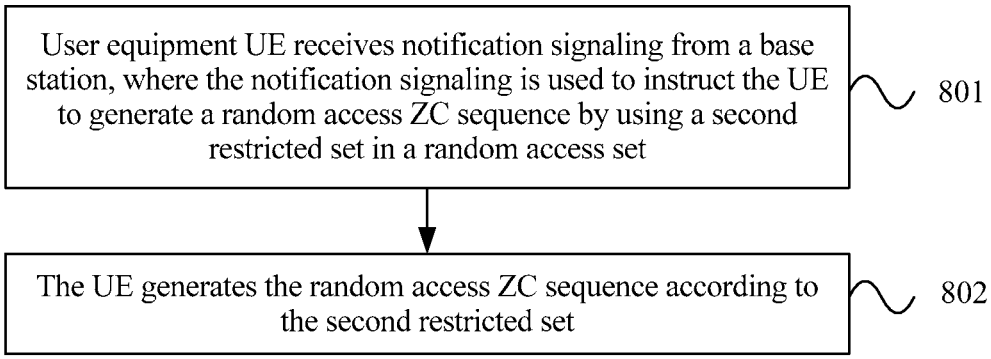
FIG. 8 is a flowchart of Embodiment 6 of a method for generating a random access channel ZC sequence according to the present invention.

FIG. 8 is a flowchart of Embodiment 6 of a method for generating a random access channel ZC sequence according to the present invention. As shown in FIG. 8, the method in this embodiment may include the following steps.

Step 801: User equipment UE receives notification signaling from a base station, where the notification signaling is used to instruct the UE to generate a random access ZC sequence by using a second restricted set in a random access set.

The random access set includes an unrestricted set, a first restricted set, and the second restricted set; and the second restricted set is a random access set that the UE needs to use when a Doppler frequency shift of the UE is greater than or equal to a first predetermined value, and the first predetermined value is greater than one time a physical random access channel PRACH subcarrier spacing.

It should be noted that: the first restricted set is a random access set that the UE needs to use when the Doppler frequency shift of the UE is greater than or equal to a second predetermined value, and the unrestricted set is a random access set that the UE needs to use when the Doppler frequency shift of the UE is less than or equal to a third predetermined value, where the second predetermined value is less than the first predetermined value, and the third predetermined value is less than the second predetermined value.

Step 802: The UE generates the random access ZC sequence according to the second restricted set.

In the prior art, to avoid mutual interference between multiple UE random access sequences caused by a Doppler frequency shift, an existing LTE system is dedicatedly designed, and the design is based on a premise that the Doppler frequency shift is less than one time the PRACH subcarrier spacing. In the present invention, when the Doppler frequency shift of the UE is greater than or equal to the first predetermined value (where the first predetermined value is greater than one time the PRACH subcarrier spacing), the UE generates a random access ZC sequence by using the second restricted set as instructed by the base station.

In the prior art, to avoid mutual interference between multiple UE random access sequences caused by a Doppler frequency shift, an existing LTE system is dedicatedly designed, and the design is based on a premise that the Doppler frequency shift is less than one time the PRACH subcarrier spacing. However, as requirements for wireless communication continuously increase, when the LTE system performs communication at a higher operating frequency, a case in which the Doppler frequency shift is greater than one time the PRACH subcarrier spacing and less than two times the PRACH subcarrier spacing may occur. In the existing LTE system, when the Doppler frequency shift is greater than one time the PRACH subcarrier spacing and less than two times the PRACH subcarrier spacing, there is a problem of mutual interference between multiple UE random access sequences. In the present invention, when the Doppler frequency shift of the UE is greater than or equal to the first predetermined value (where the first predetermined value is greater than one time the PRACH subcarrier spacing), the UE generates a random access ZC sequence by using the second restricted set as instructed by the base station, which implements dedicated design for the LTE system in the case in which the Doppler frequency shift is greater than one time the PRACH subcarrier spacing and less than two times the PRACH subcarrier spacing, thereby avoiding the mutual interference between the multiple UE random access sequences when the Doppler frequency shift is greater than one time the PRACH subcarrier spacing and less than two times the PRACH subcarrier spacing, and improving accuracy of decoding a random access sequence by the base station.

In this embodiment, when a Doppler frequency shift of UE is greater than or equal to a first predetermined value (where the first predetermined value is greater than one time a PRACH subcarrier spacing), the UE generates a random access ZC sequence by using a second restricted set as instructed by a base station, which resolves a problem of mutual interference between multiple UE random access sequences caused when the Doppler frequency shift is greater than one time the PRACH subcarrier spacing and less than two times the PRACH subcarrier spacing, thereby avoiding the mutual interference between the multiple UE random access sequences, and improving accuracy of decoding a random access sequence by the base station.

Figure 9:
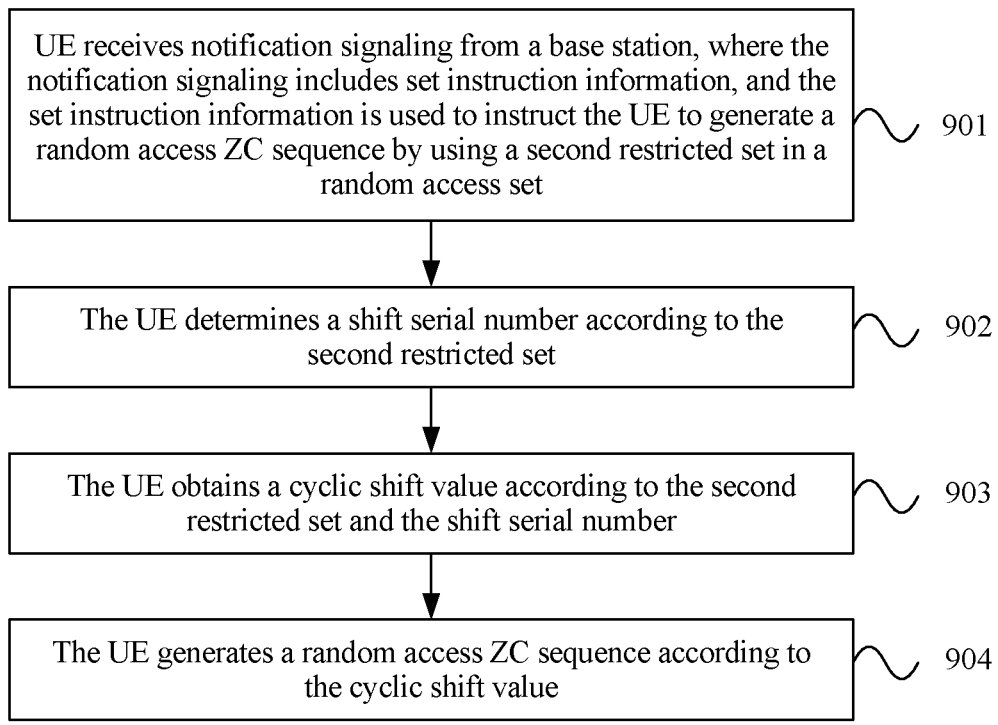
FIG. 9 is a flowchart of Embodiment 7 of a method for generating a random access channel ZC sequence according to the present invention.

FIG. 9 is a flowchart of Embodiment 7 of a method for generating a random access channel ZC sequence according to the present invention. As shown in FIG. 9, the method in this embodiment may include the following steps.

Step 901: UE receives notification signaling from a base station, where the notification signaling includes set instruction information, and the set instruction information is used to instruct the UE to generate the random access ZC sequence by using a second restricted set in a random access set.

The random access set includes an unrestricted set, a first restricted set, and the second restricted set.

The second restricted set is a random access set that the UE needs to use when a Doppler frequency shift of the UE is greater than or equal to a first predetermined value.

It should be noted that a relationship among the unrestricted set, the first restricted set, and the second restricted set is the same as that in step 801, and details are not described herein again.

Step 902: The UE determines a shift serial number according to the second restricted set.

Optionally, the UE selects and obtains the shift serial number v from a range of 0 to $(n_{shift}^{RA} n_{group}^{RA} + \bar{n}_{shift}^{RA} - 1)$, where v is a positive integer, and $n_{shift}^{RA}$ is a quantity of candidate sequence shifts of UE in one group, $n_{group}^{RA}$ is a quantity of groups, and $\underline{n}_{shift}^{RA}$ is a quantity of candidate sequence shifts of UE within a last length that is insufficient for one group.

Optionally, the UE randomly selects a shift serial number from a range of 0 to $(n_{shift}^{RA} n_{group}^{RA} + \bar{n}_{shift}^{RA} - 1)$, or the UE sequentially selects and traverses all shift serial numbers in a range of 0 to X, where X is an integer less than $(n_{shift}^{RA} n_{group}^{RA} + \bar{n}_{shift}^{RA} - 1)$.

Step 903: The UE obtains a cyclic shift value according to the second restricted set and the shift serial number.

Optionally, the UE obtains the cyclic shift value $C_v$ according to the shift serial number v by using formula (1).

Step 904: The UE generates a random access ZC sequence according to the cyclic shift value.

Optionally, the UE generates a random access ZC sequence $x_{u,C_v}(n)$ according to the cyclic shift value by using the following formula (14):

$$x_{u,C_v}(n) = x_u((n+C_v) \bmod N_{ZC}) \qquad (14)\text{, where}$$

$N_{ZC}$ is a sequence length, $C_v$ is the cyclic shift value, and a ZC sequence whose root is u is defined as $$x_u(n) = e^{-j\frac{\pi u n(n+1)}{N_{ZC}}},$$

where $0 \leq n \leq N_{ZC} - 1$.

Specific descriptions about $n_{shift}^{RA}$, $d_{start}$, $n_{group}^{RA}$, and $\bar{n}_{shift}^{RA}$ in this embodiment are the same as those in Embodiment 3 of the method for generating a random access channel ZC sequence, and details are not described herein again.

In this embodiment, when a Doppler frequency shift of UE is greater than or equal to a first predetermined value (where the first predetermined value is greater than one time a PRACH subcarrier spacing), the UE generates a random access ZC sequence by using a second restricted set and according to set instruction information sent by a base station, which resolves a problem of mutual interference between multiple UE random access sequences caused when the Doppler frequency shift is greater than one time the PRACH subcarrier spacing and less than two times the PRACH subcarrier spacing, thereby avoiding the mutual interference between the multiple UE random access sequences, and improving accuracy of decoding a random access sequence by the base station.

Figure 10:
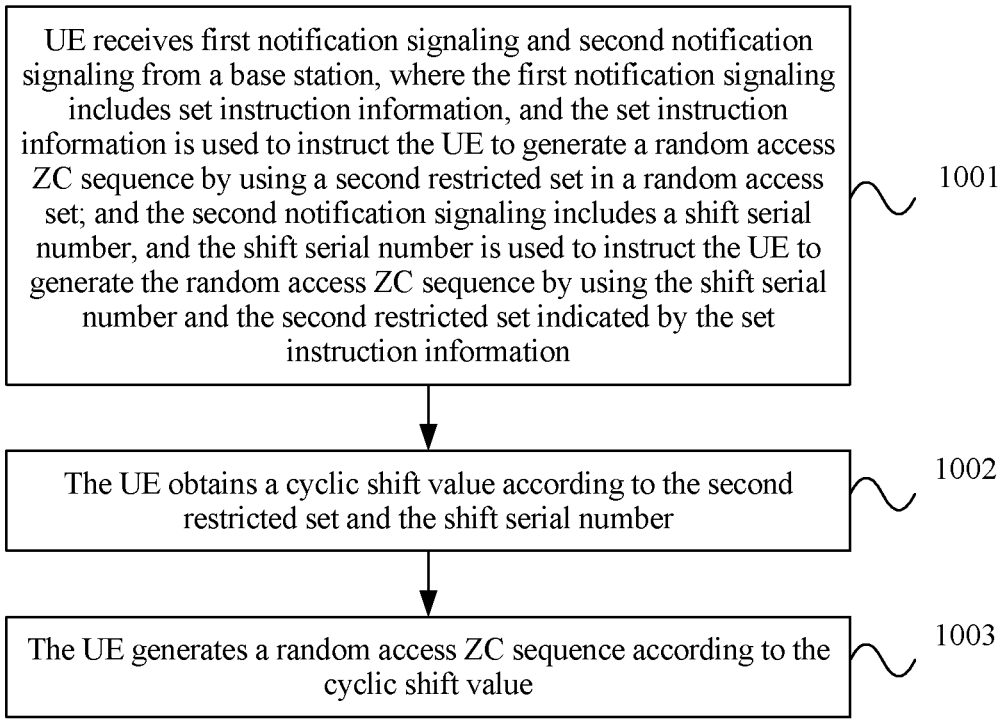
FIG. 10 is a flowchart of Embodiment 8 of a method for generating a random access channel ZC sequence according to the present invention.

FIG. 10 is a flowchart of Embodiment 8 of a method for generating a random access channel ZC sequence according to the present invention. As shown in FIG. 10, the method in this embodiment may include the following steps.

Step 1001: UE receives first notification signaling and second notification signaling from a base station, where the first notification signaling includes set instruction information, and the set instruction information is used to instruct the UE to generate a random access ZC sequence by using a second restricted set in a random access set; and the second notification signaling includes a shift serial number, and the shift serial number is used to instruct the UE to generate the random access ZC sequence by using the shift serial number and the second restricted set indicated by the set instruction information.

The random access set includes an unrestricted set, a first restricted set, and the second restricted set.

The second restricted set is a random access set that the UE needs to use when a Doppler frequency shift of the UE is greater than or equal to a first predetermined value.

It should be noted that a relationship among the unrestricted set, the first restricted set, and the second restricted set is the same as that in step 801, and details are not described herein again.

It should be noted that, in this step, the UE may receive the set instruction information and the shift serial number from the base station by using a piece of signaling.

Step 1002: The UE obtains a cyclic shift value according to the second restricted set and the shift serial number.

A method for obtaining the cyclic shift value by the UE according to the shift serial number is the same as that in step 903, and details are not described herein again.

It should be noted that the UE has already received the shift serial number from the base station in step 1001. Therefore, in comparison with Embodiment 6 of the method for generating a random access channel ZC sequence, in this embodiment, when generating a random access ZC sequence, the UE no long needs to determine the shift serial number, but directly uses the shift serial number sent by the base station in the second notification signaling.

Step 1003: The UE generates a random access ZC sequence according to the cyclic shift value.

Step 1003 is the same as step 904, and details are not described herein again.

Specific descriptions about $n_{shift}^{RA}$, $d_{start}$, $n_{group}^{RA}$, and $\bar{n}_{shift}^{RA}$ in this embodiment are the same as those in Embodiment 3 of the method for generating a random access channel ZC sequence, and details are not described herein again.

In this embodiment, when a Doppler frequency shift of UE is greater than or equal to a first predetermined value (where the first predetermined value is greater than one time a PRACH subcarrier spacing), the UE generates a random access ZC sequence by using a second restricted set and a shift serial number and according to set instruction information and the shift serial number that are sent by a base station, which resolves a problem of mutual interference between multiple UE random access sequences caused when the Doppler frequency shift is greater than one time the PRACH subcarrier spacing and less than two times the PRACH subcarrier spacing, thereby avoiding the mutual interference between the multiple UE random access sequences, and improving accuracy of decoding a random access sequence by the base station.

Figure 11:
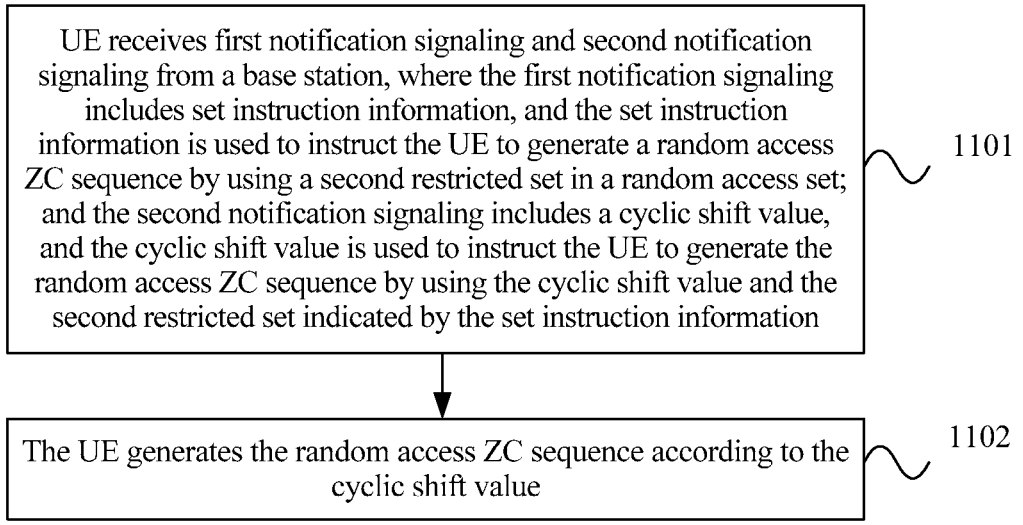
FIG. 11 is a flowchart of Embodiment 9 of a method for generating a random access channel ZC sequence according to the present invention.

FIG. 11 is a flowchart of Embodiment 9 of a method for generating a random access channel ZC sequence according to the present invention. As shown in FIG. 11, the method in this embodiment may include the following steps.

Step 1101: UE receives first notification signaling and second notification signaling from a base station, where the first notification signaling includes set instruction information, and the set instruction information is used to instruct the UE to generate a random access ZC sequence by using a second restricted set in a random access set; and the second notification signaling includes a cyclic shift value, and the cyclic shift value is used to instruct the UE to generate the random access ZC sequence by using the cyclic shift value and the second restricted set indicated by the set instruction information.

The random access set includes an unrestricted set, a first restricted set, and the second restricted set.

The second restricted set is a random access set that the UE needs to use when a Doppler frequency shift of the UE is greater than or equal to a first predetermined value.

It should be noted that a relationship among the unrestricted set, the first restricted set, and the second restricted set is the same as that in step 801, and details are not described herein again.

It should be noted that, in this step, the UE may receive the set instruction information and the cyclic shift value from the base station by using a piece of signaling.

Step 1102: The UE generates the random access ZC sequence according to the cyclic shift value.

It should be noted that the UE has already received the cyclic shift value from the base station in step 1101. Therefore, in comparison with Embodiment 7 of the method for generating a random access channel ZC sequence, in this embodiment, when generating a random access ZC sequence, the UE no long needs to determine the cyclic shift value, but directly uses the cyclic shift value sent by the base station in the second notification signaling.

Step 1102 is the same as step 904, and details are not described herein again.

Specific descriptions about $n_{shift}^{RA}$, $d_{start}$, $n_{group}^{RA}$, and $\bar{n}_{shift}^{RA}$ in this embodiment are the same as those in Embodiment 3 of the method for generating a random access channel ZC sequence, and details are not described herein again.

In this embodiment, when a Doppler frequency shift of UE is greater than or equal to a first predetermined value (where the first predetermined value is greater than one time a PRACH subcarrier spacing), the UE generates a random access ZC sequence by using a second restricted set and a cyclic shift value and according to set instruction information and the cyclic shift value that are sent by a base station, which resolves a problem of mutual interference between multiple UE random access sequences caused when the Doppler frequency shift is greater than one time the PRACH subcarrier spacing and less than two times the PRACH subcarrier spacing, thereby avoiding the mutual interference between the multiple UE random access sequences, and improving accuracy of decoding a random access sequence by the base station.

Figure 12:
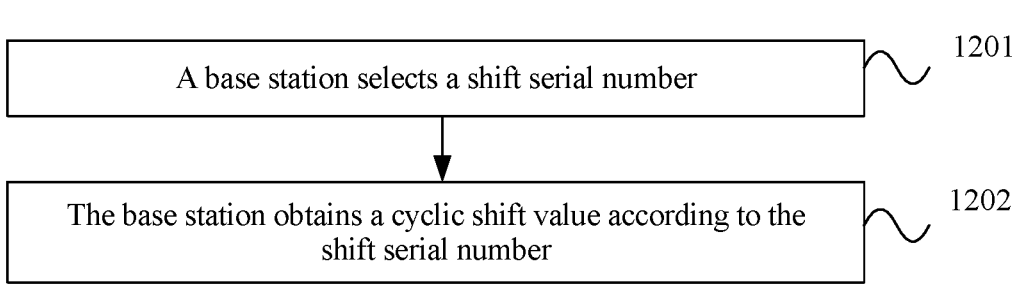
FIG. 12 is a flowchart of Embodiment 10 of a method for generating a random access channel ZC sequence according to the present invention.

FIG. 12 is a flowchart of Embodiment 10 of a method for generating a random access channel ZC sequence according to the present invention. As shown in FIG. 12, the method in this embodiment may include the following steps.

Step 1201: A base station selects a shift serial number.

Specifically, the base station selects the shift serial number v from a range of 0 to $(n_{shift}^{RA} n_{group}^{RA} + \bar{n}_{shift}^{RA} - 1)$, where v is a positive integer, $n_{shift}^{RA}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group.

Step 1202: The base station obtains a cyclic shift value according to the shift serial number.

Specifically, the base station obtains the cyclic shift value $C_v$ according to the shift serial number v by using the following formula (1):

$$C_v = d_{offset} + d_{start} \lfloor v/n_{shift}^{RA} \rfloor + (v \bmod n_{shift}^{RA}) N_{CS} \quad (1),$$

where $d_{offset}$ is a shift offset, $d_{start}$ is a cyclic shift distance between neighboring groups, $n_{shift}^{RA}$ is a quantity of users that can be differentiated by one group, and $N_{CS}$ is a quantity of cyclic shifts occupied by one user.

In this embodiment, $n_{shift}^{RA}$, $d_{start}$, $n_{group}^{RA}$, and $\bar{n}_{shift}^{RA}$ meet formulas (2) to (5); or $n_{shift}^{RA}$, $d_{start}$, $n_{group}^{RA}$, and $\bar{n}_{shift}^{RA}$ meet formulas (6) to (9); or $n_{shift}^{RA}$, $d_{start}$, $n_{group}^{RA}$, and $\bar{n}_{shift}^{RA}$ meet formulas (10) to (13).

It should be noted that specific descriptions about $n_{shift}^{RA}$, $d_{start}$, $n_{group}^{RA}$, and $\bar{n}_{shift}^{RA}$ in this embodiment are the same as those in Embodiment 3 of the method for generating a random access channel ZC sequence, and details are not described herein again.

Optionally, when $N_{CS} \leq d_u < N_{ZC}/5$, $n_{shift}^{RA}$, $d_{start}$, $n_{group}^{RA}$, and $\bar{n}_{shift}^{RA}$ meet formulas (2) to (5); when $N_{ZC}/5 \leq d_u \leq (N_{ZC} - N_{CS})/4$, $n_{shift}^{RA}$, $d_{start}$, $n_{group}^{RA}$, and $\bar{n}_{shift}^{RA}$ meet formulas (6) to (9); or when $(N_{ZC} + N_{CS})/4 \leq d_u \leq (N_{ZC} - N_{CS})/3$, $n_{shift}^{RA}$, $d_{start}$, $n_{group}^{RA}$, and $\bar{n}_{shift}^{RA}$ meet formulas (10) to (13).

In this embodiment, a shift serial number is selected from a range of 0 to $(n_{shift}^{RA} n_{group}^{RA} + \bar{n}_{shift}^{RA} - 1)$ by using $n_{shift}^{RA}$, $d_{start}$, $n_{group}^{RA}$, and $\bar{n}_{shift}^{RA}$ meet formulas (2) to (5), or formulas (6) to (9), or formulas (10) to (13), and a cyclic shift value is obtained according to the shift serial number by using formula (1), so that a base station shifts a ZC sequence whose root is u by using the obtained cyclic shift value, and detects a random access ZC sequence sent by UE, thereby improving accuracy of decoding, by the base station, the random access ZC sequence sent by the UE.

Figure 13:
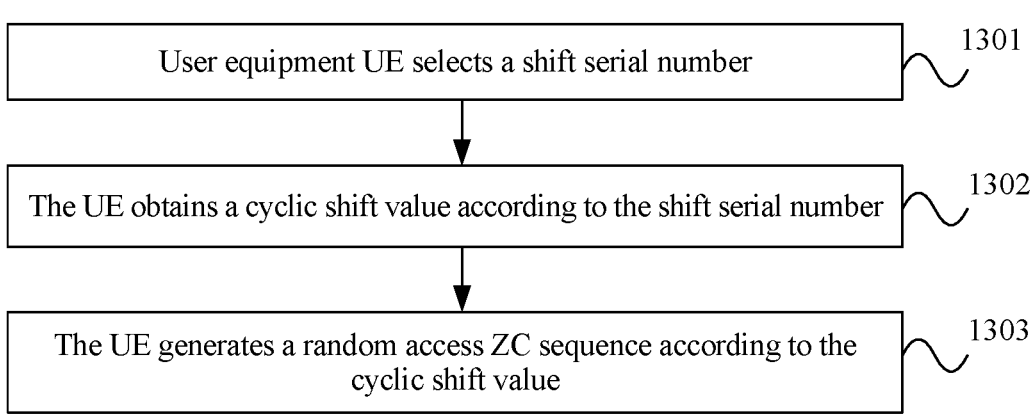
FIG. 13 is a flowchart of Embodiment 11 of a method for generating a random access channel ZC sequence according to the present invention.

FIG. 13 is a flowchart of Embodiment 11 of a method for generating a random access channel ZC sequence according to the present invention. As shown in FIG. 13, the method in this embodiment may include the following steps.

Step 1301: User equipment UE selects a shift serial number.

Specifically, the UE selects the shift serial number v from a range of 0 to $(n_{shift}^{RA} n_{group}^{RA} + \bar{n}_{shift}^{RA} - 1)$, where v is a positive integer, $n_{shift}^{RA}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group.

Step 1302: The UE obtains a cyclic shift value according to the shift serial number.

Specifically, the UE obtains the cyclic shift value $C_v$ according to the shift serial number v by using the following formula (1):

$$C_v = d_{offset} + d_{start} \lfloor v/n_{shift}^{RA} \rfloor + (v \bmod n_{shift}^{RA}) N_{CS} \quad (1), \text{ where}$$

$d_{offset}$ is a shift offset, $d_{start}$ is a cyclic shift distance between neighboring groups, $n_{shift}^{RA}$ is a quantity of users that can be differentiated by one group, and $N_{CS}$ is a quantity of cyclic shifts occupied by one user.

Step 1303: The UE generates a random access ZC sequence according to the cyclic shift value.

Specifically, the UE generates a random access ZC sequence $x_{u,C_v}(n)$ according to the cyclic shift value $C_v$ by using the following formula (14):

$$x_{u,C_v}(n) = x_u((n+C_v) \bmod N_{ZC}) \quad (14),$$

where $N_{ZC}$ is a sequence length, and a ZC sequence whose root is u is defined as $$x_u(n) = e^{-j\frac{\pi u n(n+1)}{N_{ZC}}},$$

where $0 \leq n \leq N_{ZC}-1$.

In this embodiment, $n_{shift}^{RA}$, $d_{start}$, $n_{group}^{RA}$, and $\bar{n}_{shift}^{RA}$ meet formulas (2) to (5); or $n_{shift}^{RA}$, $d_{start}$, $n_{group}^{RA}$, and $\bar{n}_{shift}^{RA}$ meet formulas (6) to (9); or $n_{shift}^{RA}$, $d_{start}$, $n_{group}^{RA}$, and $\bar{n}_{shift}^{RA}$ meet formulas (10) to (13).

It should be noted that specific descriptions about $n_{shift}^{RA}$, $d_{start}$, $n_{group}^{RA}$, and $\bar{n}_{shift}^{RA}$ in this embodiment are the same as those in Embodiment 3 of the method for generating a random access channel ZC sequence, and details are not described herein again.

Optionally, when $N_{CS} \leq d_u < N_{ZC}/5$, $n_{shift}^{RA}$, $d_{start}$, $n_{group}^{RA}$, and $\bar{n}_{shift}^{RA}$, and shift meet formulas (2) to (5); when $N_{ZC}/5 \leq d_u \leq (N_{ZC}-N_{CS})/4$, $n_{shift}^{RA}$, $d_{start}$, $n_{group}^{RA}$, and $\bar{n}_{shift}^{RA}$ meet formulas (6) to (9); or when $(N_{ZC}+N_{CS})/4 \leq d_u \leq (N_{ZC}-N_{CS})/3$, $n_{shift}^{RA}$, $d_{start}$, $n_{group}^{RA}$, and $\bar{n}_{shift}^{RA}$ meet formulas (10) to (13).

In this embodiment, a shift serial number is selected from a range of 0 to $(n_{shift}^{RA} n_{group}^{RA} + \bar{n}_{shift}^{RA} - 1)$ by using $n_{shift}^{RA}$, $d_{start}$, $n_{group}^{RA}$, and $\bar{n}_{shift}^{RA}$ meet formulas (2) to (5), or formulas (6) to (9), or formulas (10) to (13), a cyclic shift value is obtained according to the shift serial number by using formula (1), and a random access ZC sequence is generated according to the cyclic shift value, which prevents ZC sequences, corresponding to five peak points generated by a receive end of a base station when a Doppler frequency shift is greater than one time a PRACH subcarrier spacing and less than two times the PRACH subcarrier spacing, from being allocated to another user, thereby avoiding a problem of mutual interference between random access ZC sequences generated by multiple UEs, and improving accuracy of decoding a random access sequence by the base station.

Figure 14:
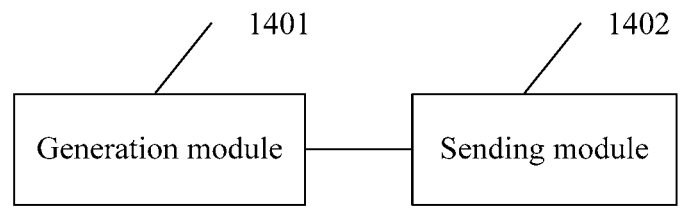
FIG. 14 is a schematic structural diagram of Embodiment 1 of a base station according to the present invention.

FIG. 14 is a schematic structural diagram of Embodiment 1 of a base station according to the present invention. As shown in FIG. 14, the base station in this embodiment may include a generation module 1401 and a sending module 1402. The generation module 1401 is configured to generate notification signaling, where the notification signaling is used to instruct UE to generate a random access ZC sequence by using a second restricted set in a random access set. The sending module 1402 is configured to send the notification signaling to the UE, so that the UE generates the random access ZC sequence by using the second restricted set.

The random access set includes an unrestricted set, a first restricted set, and the second restricted set.

The second restricted set is a random access set that the UE needs to use when a Doppler frequency shift of the UE is greater than or equal to a first predetermined value, and the first predetermined value is greater than one time a physical random access channel PRACH subcarrier spacing.

The base station in this embodiment may be configured to execute the technical solution in the method embodiment shown in FIG. 1. Implementation principles and technical effects thereof are similar, and details are not described herein again.

Figure 15:
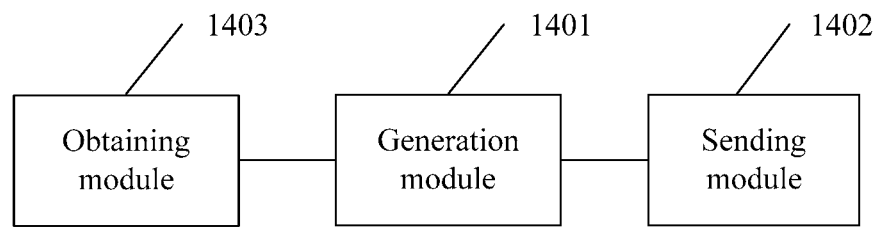
FIG. 15 is a schematic structural diagram of Embodiment 2 of a base station according to the present invention.

FIG. 15 is a schematic structural diagram of Embodiment 2 of a base station according to the present invention. As shown in FIG. 15, the base station in this embodiment is based on a structure of the base station shown in FIG. 14. Further, the base station may further include: an obtaining module 1403, where the obtaining module 1403 is configured to obtain the Doppler frequency shift of the UE. The generation module 1401 is specifically configured to generate the notification signaling if the Doppler frequency shift of the UE is greater than or equal to the first predetermined value, where the notification signaling is used to instruct the UE to generate the random access ZC sequence by using the second restricted set in the random access set.

The base station in this embodiment may be configured to execute the technical solution in Embodiment 2 of the method for generating a random access channel ZC sequence. Implementation principles and technical effects thereof are similar, and details are not described herein again.

Figure 16:
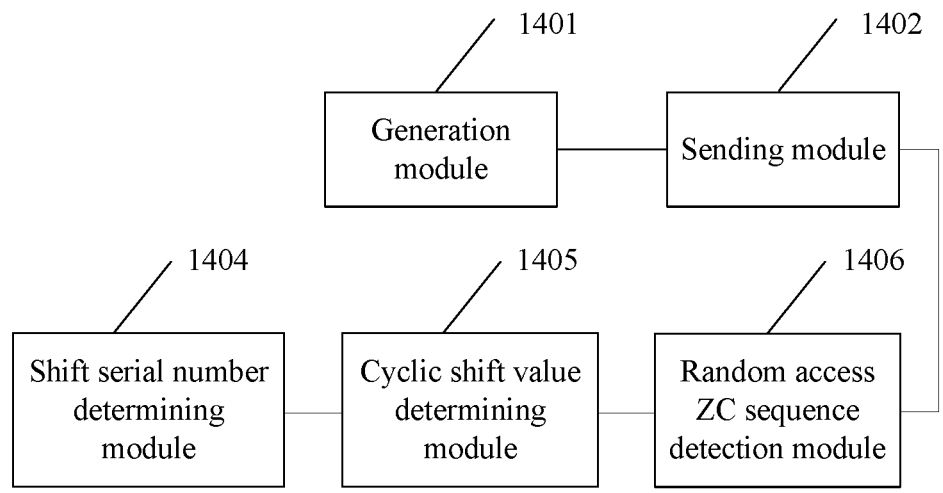
FIG. 16 is a schematic structural diagram of Embodiment 3 of a base station according to the present invention.

FIG. 16 is a schematic structural diagram of Embodiment 3 of a base station according to the present invention. As shown in FIG. 16, the base station in this embodiment is based on a structure of the base station shown in FIG. 14. Further, the generation module 1401 is specifically configured to generate the notification signaling, where the notification signaling includes set instruction information, and the set instruction information is used to instruct the UE to generate the random access ZC sequence by using the second restricted set in the random access set.

Optionally, the base station may further include: a shift serial number determining module 1404, configured to determine a shift serial number according to the second restricted set; a cyclic shift value determining module 1405, configured to obtain a cyclic shift value according to the second restricted set and the shift serial number; and a random access ZC sequence detection module 1406, configured to: generate a ZC sequence according to the cyclic shift value, and detect, by using the ZC sequence, a random access ZC sequence sent by the UE, where the random access ZC sequence is generated by the UE by using the second restricted set.

Optionally, the shift serial number determining module 1404 is specifically configured to select the shift serial number v from a range of 0 to $(n_{shift}^{RA} n_{group}^{RA} + \bar{n}_{shift}^{RA} - 1)$, where v is a positive integer, $n_{shift}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group.

Optionally, the cyclic shift value determining module 1405 is specifically configured to obtain a cyclic shift value $C_v$ of the UE according to the shift serial number v by using formula (1).

The base station in this embodiment may be configured to execute the technical solution in the method embodiment shown in FIG. 2. Implementation principles and technical effects thereof are similar, and details are not described herein again.

Figure 17:
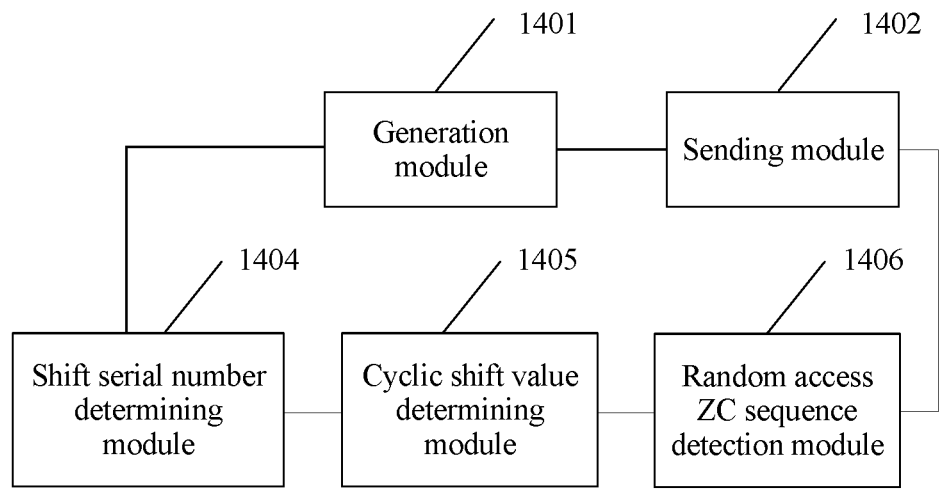
FIG. 17 is a schematic structural diagram of Embodiment 4 of a base station according to the present invention.

FIG. 17 is a schematic structural diagram of Embodiment 4 of a base station according to the present invention. As shown in FIG. 17, the base station in this embodiment is based on a structure of the base station shown in FIG. 14. Further, the generation module 1401 is specifically configured to generate first notification signaling and second notification signaling, where the first notification signaling includes set instruction information, and the set instruction information is used to instruct the UE to generate the random access ZC sequence by using the second restricted set in the random access set; and the second notification signaling includes a shift serial number, and the shift serial number is used to instruct the UE to generate the random access ZC sequence by using the shift serial number and the second restricted set indicated by the set instruction information.

Optionally, the base station may further include: a shift serial number determining module 1404, configured to determine the shift serial number according to the second restricted set, so that the generation module generates the second notification signaling according to the shift serial number.

Further, optionally, the base station may further include: a cyclic shift value determining module 1405, configured to obtain a cyclic shift value according to the second restricted set and the shift serial number; and a random access ZC sequence detection module 1406, configured to: generate a ZC sequence according to the cyclic shift value, and detect, by using the ZC sequence, a random access ZC sequence sent by the UE, where the random access ZC sequence is generated by the UE by using the second restricted set.

Optionally, the shift serial number determining module 1404 is specifically configured to select the shift serial number v from a range of 0 to $(n_{shift}^{RA} n_{group}^{RA} + \bar{n}_{shift}^{RA} - 1)$, where v is a positive integer, $n_{shift}^{RA}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group.

Optionally, the cyclic shift value determining module 1405 is specifically configured to obtain a cyclic shift value $C_v$ of the UE according to the shift serial number v by using formula (1).

The base station in this embodiment may be configured to execute the technical solution in the method embodiment shown in FIG. 6. Implementation principles and technical effects thereof are similar, and details are not described herein again.

Figure 18:
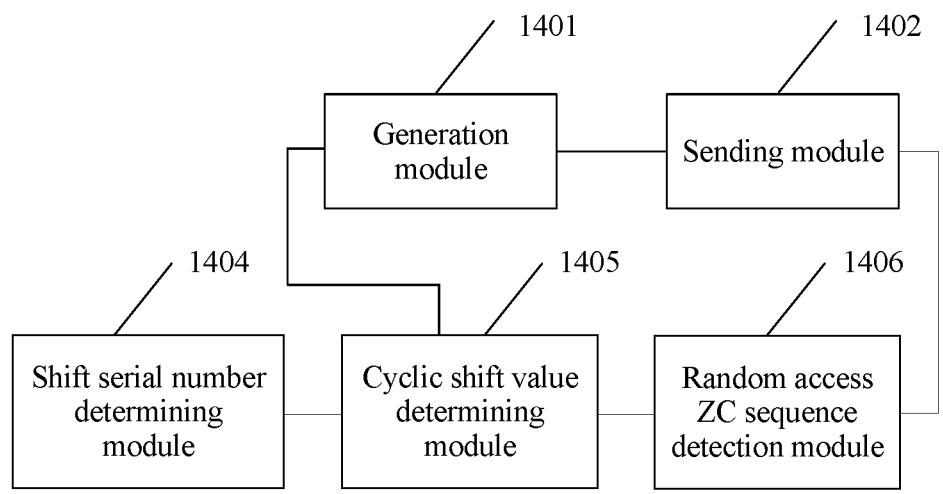
FIG. 18 is a schematic structural diagram of Embodiment 5 of a base station according to the present invention.

FIG. 18 is a schematic structural diagram of Embodiment 5 of a base station according to the present invention. As shown in FIG. 18, the base station in this embodiment is based on a structure of the base station shown in FIG. 14. Further, the generation module 1401 is specifically configured to generate first notification signaling and second notification signaling, where the first notification signaling includes set instruction information, and the set instruction information is used to instruct the UE to generate the random access ZC sequence by using the second restricted set in the random access set; and the second notification signaling includes a cyclic shift value, and the cyclic shift value is used to instruct the UE to generate the random access ZC sequence by using the cyclic shift value and the second restricted set indicated by the set instruction information.

Optionally, the base station may further include: a shift serial number determining module 1404, configured to determine a shift serial number according to the second restricted set; and a cyclic shift value determining module 1405, configured to obtain the cyclic shift value according to the second restricted set and the shift serial number, so that the generation module generates the second notification signaling according to the cyclic shift value.

Further, optionally, the base station may further include: a random access ZC sequence detection module 1406, configured to: generate a ZC sequence according to the cyclic shift value, and detect, by using the ZC sequence, a random access ZC sequence sent by the UE, where the random access ZC sequence is generated by the UE by using the second restricted set.

Optionally, the shift serial number determining module 1404 is specifically configured to select the shift serial number v from a range of 0 to $(n_{shift}^{RA} n_{group}^{RA} + \bar{n}_{shift}^{RA} - 1)$, where v is a positive integer, $n_{shift}^{RA}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group.

Optionally, the cyclic shift value determining module 1405 is specifically configured to obtain a cyclic shift value $C_v$ of the UE according to the shift serial number v by using formula (1).

The base station in this embodiment may be configured to execute the technical solution in the method embodiment shown in FIG. 7. Implementation principles and technical effects thereof are similar, and details are not described herein again.

Figure 19:
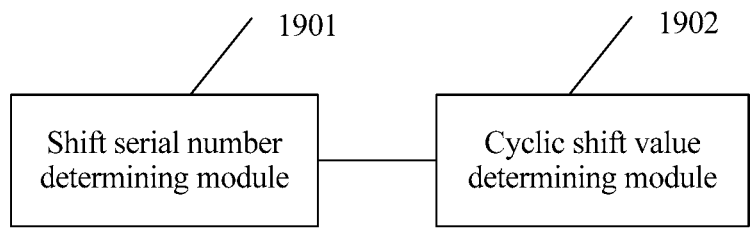
FIG. 19 is a schematic structural diagram of Embodiment 6 of a base station according to the present invention.

FIG. 19 is a schematic structural diagram of Embodiment 6 of a base station according to the present invention. As shown in FIG. 19, the base station in this embodiment may include a shift serial number determining module 1901 and a cyclic shift value determining module 1902. The shift serial number determining module 1901 is configured to select a shift serial number v from a range of 0 to $(n_{shift}^{RA} n_{group}^{RA} + \bar{n}_{shift}^{RA} - 1)$, where v is a positive integer, $n_{shift}^{RA}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group. The cyclic shift value determining module 1902 is configured to obtain a cyclic shift value C according to the shift serial number v by using formula (1).

$n_{shift}^{RA}$, $d_{start}$, $n_{group}^{RA}$, and $\bar{n}_{shift}^{RA}$ meet formulas (2) to (5); $n_{shift}^{RA}$, $d_{start}$, $n_{group}^{RA}$, and $\bar{n}_{shift}^{RA}$ meet formulas (6) to (9); $n_{shift}^{RA}$, $d_{start}$, $n_{group}^{RA}$, and $\bar{n}_{shift}^{RA}$ meet formulas (10) to (13).

Optionally, when $N_{CS} \le d_u < N_{ZC}/5$, $n_{shift}^{RA}$, $d_{start}$, $n_{group}^{RA}$, and $\bar{n}_{shift}^{RA}$ meet formulas (2) to (5); when $N_{ZC}/5 \le d_u \le (N_{ZC} - N_{CS})/4$, $n_{shift}^{RA}$, $d_{start}$, $n_{group}^{RA}$, and $\bar{n}_{shift}^{RA}$ meet formulas (6) to (9); or when $(N_{ZC} + N_{CS})/4 \le d_u \le (N_{ZC} - N_{CS})/3$, $n_{shift}^{RA}$, $d_{start}$, $n_{group}^{RA}$, and $\bar{n}_{shift}^{RA}$ meet formulas (10) to (13).

The base station in this embodiment may be configured to execute the technical solution in the method embodiment shown in FIG. 12. Implementation principles and technical effects thereof are similar, and details are not described herein again.

Figure 20:
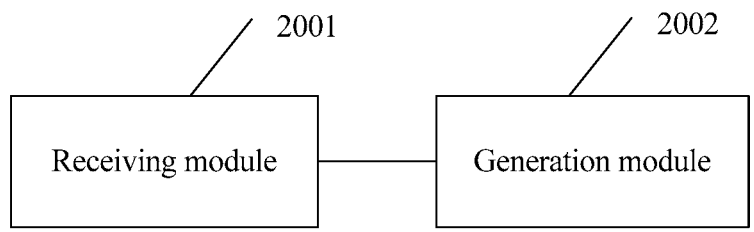
FIG. 20 is a schematic structural diagram of Embodiment 1 of user equipment according to the present invention.

FIG. 20 is a schematic structural diagram of Embodiment 1 of user equipment according to the present invention. As shown in FIG. 20, the user equipment in this embodiment may include a receiving module 2001 and a generation module 2002. The receiving module 2001 is configured to receive notification signaling from a base station, where the notification signaling is used to instruct the user equipment UE to generate a random access ZC sequence by using a second restricted set in a random access set. The generation module 2002 is configured to generate a random access ZC sequence according to the second restricted set.

The random access set includes an unrestricted set, a first restricted set, and the second restricted set; and the second restricted set is a random access set that the UE needs to use when a Doppler frequency shift of the UE is greater than or equal to a first predetermined value, and the first predetermined value is greater than one time a physical random access channel PRACH subcarrier spacing.

The user equipment in this embodiment may be configured to execute the technical solution in the method embodiment shown in FIG. 8. Implementation principles and technical effects thereof are similar, and details are not described herein again.

Figure 21:
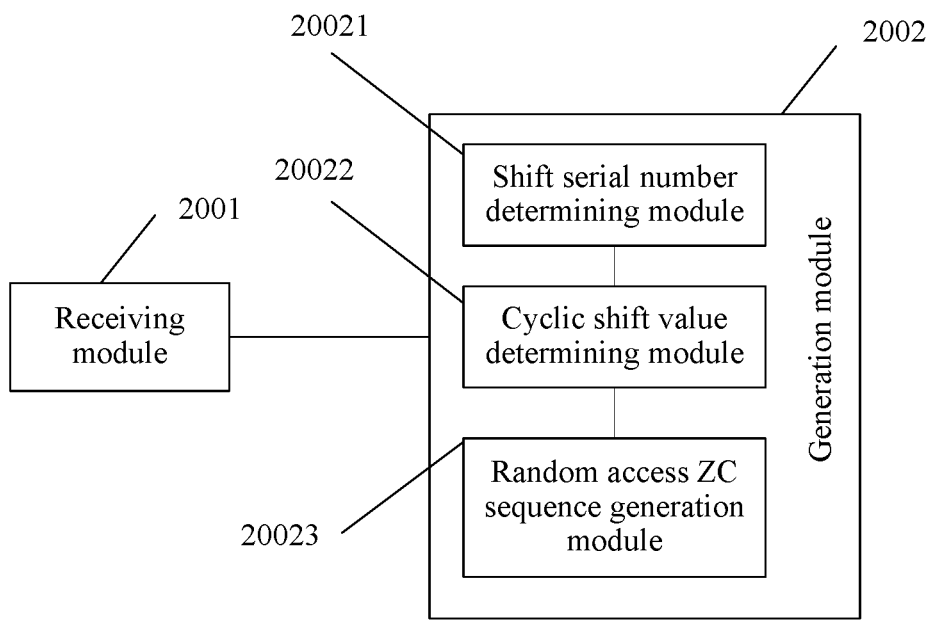
FIG. 21 is a schematic structural diagram of Embodiment 2 of user equipment according to the present invention.

FIG. 21 is a schematic structural diagram of Embodiment 2 of user equipment according to the present invention. As shown in FIG. 21, the user equipment in this embodiment is based on a structure of the user equipment shown in FIG. 20. Further, the receiving module 2001 is specifically configured to receive the notification signaling from the base station, where the notification signaling includes set instruction information, and the set instruction information is used to instruct the UE to generate the random access ZC sequence by using the second restricted set in the random access set. The generation module 2002 includes: a shift serial number determining module 20021, configured to determine a shift serial number according to the second restricted set; a cyclic shift value determining module 20022, configured to obtain a cyclic shift value according to the second restricted set and the shift serial number; and a random access ZC sequence generation module 20023, configured to generate a random access ZC sequence according to the cyclic shift value.

Optionally, the shift serial number determining module 20021 is specifically configured to select the shift serial number v from a range of 0 to $(n_{shift}^{RA} n_{group}^{RA} + \bar{n}_{shift}^{RA} - 1)$, where v is a positive integer, $n_{shift}^{RA}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group.

Optionally, the cyclic shift value determining module 20022 is specifically configured to obtain the cyclic shift value $C_v$ according to the shift serial number v by using formula (1).

Optionally, the random access ZC sequence generation module 20023 is specifically configured to generate a random access ZC sequence $x_{u,C_v}(n)$ according to the cyclic shift value by using formula (14).

The user equipment in this embodiment may be configured to execute the technical solution in the method embodiment shown in FIG. 9. Implementation principles and technical effects thereof are similar, and details are not described herein again.

Figure 22:
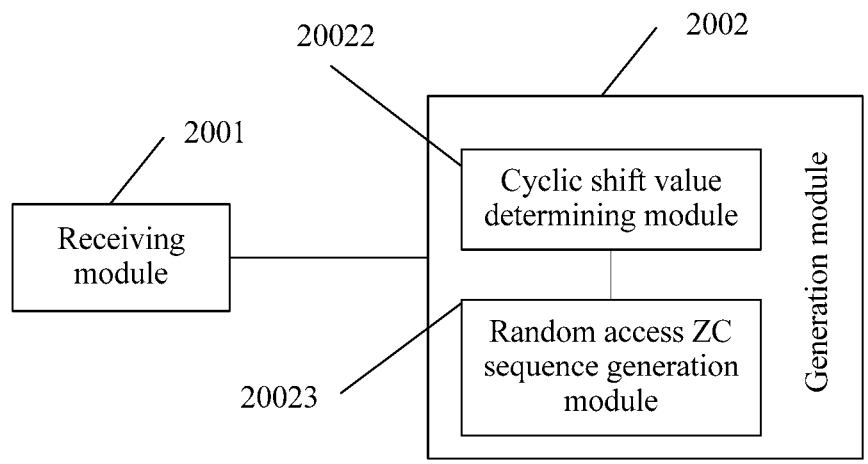
FIG. 22 is a schematic structural diagram of Embodiment 3 of user equipment according to the present invention.

FIG. 22 is a schematic structural diagram of Embodiment 3 of user equipment according to the present invention. As shown in FIG. 22, the user equipment in this embodiment is based on a structure of the user equipment shown in FIG. 20. Further, the receiving module 2001 is specifically configured to receive first notification signaling and second notification signaling from the base station, where the first notification signaling includes set instruction information, and the set instruction information is used to instruct the UE to generate the random access ZC sequence by using the second restricted set in the random access set; and the second notification signaling includes a shift serial number, and the shift serial number is used to instruct the UE to generate the random access ZC sequence by using the shift serial number and the second restricted set indicated by the set instruction information. The generation module 2002 includes: a cyclic shift value determining module 20022, configured to obtain a cyclic shift value according to the second restricted set and the shift serial number; and a random access ZC sequence generation module 20023, configured to generate a random access ZC sequence according to the cyclic shift value.

Optionally, the cyclic shift value determining module 20022 is specifically configured to obtain the cyclic shift value $C_v$ according to the shift serial number v by using formula (1).

Optionally, the random access ZC sequence generation module 20023 is specifically configured to generate a random access ZC sequence $x_{u,C_v}(n)$ according to the cyclic shift value by using formula (14).

The user equipment in this embodiment may be configured to execute the technical solution in the method embodiment shown in FIG. 10. Implementation principles and technical effects thereof are similar, and details are not described herein again.

Figure 23:
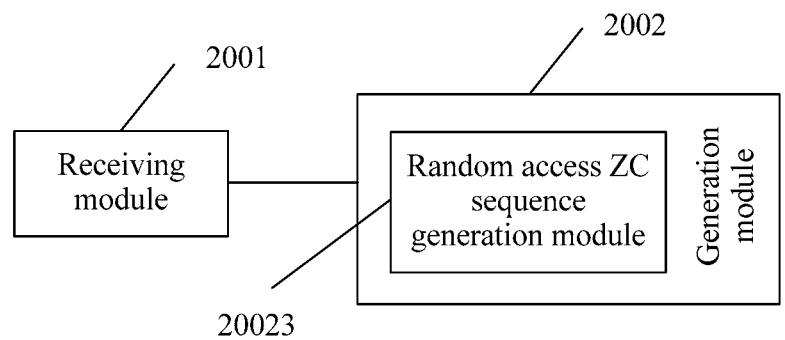
FIG. 23 is a schematic structural diagram of Embodiment 4 of user equipment according to the present invention.

FIG. 23 is a schematic structural diagram of Embodiment 4 of user equipment according to the present invention. As shown in FIG. 23, the user equipment in this embodiment is based on a structure of the base station shown in FIG. 20. Further, the receiving module 2001 is specifically configured to receive first notification signaling and second notification signaling from the base station, where the first notification signaling includes set instruction information, and the set instruction information is used to instruct the UE to generate the random access ZC sequence by using the second restricted set in the random access set; and the second notification signaling includes a cyclic shift value, and the cyclic shift value is used to instruct the UE to generate the random access ZC sequence by using the cyclic shift value and the second restricted set indicated by the set instruction information. The generation module 2002 includes a random access ZC sequence generation module 20023, configured to generate a random access ZC sequence according to the cyclic shift value.

Optionally, the random access ZC sequence generation module 20023 is specifically configured to generate a random access ZC sequence $x_{u,C_v}(n)$ according to the cyclic shift value by using formula (14).

The user equipment in this embodiment may be configured to execute the technical solution in the method embodiment shown in FIG. 11. Implementation principles and technical effects thereof are similar, and details are not described herein again.

Figure 24:
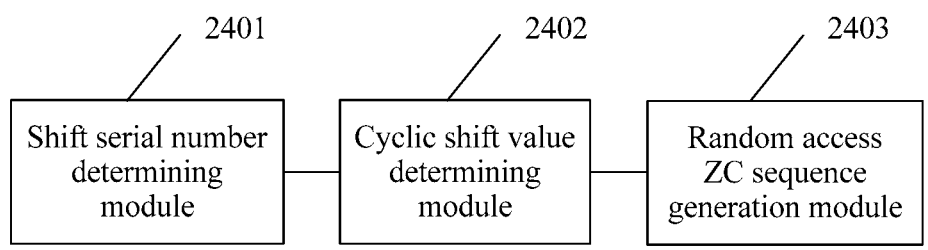
FIG. 24 is a schematic structural diagram of Embodiment 5 of user equipment according to the present invention.

FIG. 24 is a schematic structural diagram of Embodiment 5 of user equipment according to the present invention. As shown in FIG. 24, the user equipment in this embodiment may include: a shift serial number determining module 2401, a cyclic shift value determining module 2402, and a random access ZC sequence generation module 2403. The shift serial number determining module 2401 is configured to select a shift serial number v from a range of 0 to $(n_{shift}^{RA} n_{group}^{RA} + \bar{n}_{shift}^{RA} - 1)$, where v is a positive integer, $n_{shift}^{RA}$ is a quantity of candidate sequence shifts of UE in one group, $n_{group}^{RA}$ is a quantity of groups, and $\bar{n}_{shift}^{RA}$ is a quantity of candidate sequence shifts of UE within a last length that is insufficient for one group. The cyclic shift value determining module 2402 is configured to obtain a cyclic shift value $C_v$ according to the shift serial number v by using formula (1). The random access ZC sequence generation module 2403 is configured to generate a random access ZC sequence $x_{u,C_v}(n)$ according to the cyclic shift value $C_v$ by using formula (14).

$n_{shift}^{RA}$, $d_{start}$, $n_{group}^{RA}$, and $\bar{n}_{shift}^{RA}$ meet formulas (2) to (5); or $n_{shift}^{RA}$, $d_{start}$, $n_{group}^{RA}$, and $\bar{n}_{shift}^{RA}$ meet formulas (6) to (9); or $n_{shift}^{RA}$, $d_{start}$, $n_{group}^{RA}$, and $\bar{n}_{shift}^{RA}$ meet formulas (10) to (13).

Optionally, when $N_{CS} \leq d_u < N_{ZC}/5$, $n_{shift}^{RA}$, $d_{start}$, $n_{group}^{RA}$, and $\bar{n}_{shift}^{RA}$ meet formulas (2) to (5); when $N_{ZC}/5 \leq d_u \leq (N_{ZC} - N_{CS})/4$, $n_{shift}^{RA}$, $d_{start}$, $n_{group}^{RA}$, and $\bar{n}_{shift}^{RA}$ meet formulas (6) to (9); or when $(N_{ZC}+N_{CS})/4 \leq d_u \leq (N_{ZC}-N_{CS})/3$, $n_{shift}^{RA}$, $d_{start}$, $n_{group}^{RA}$, and $\bar{n}_{shift}^{RA}$ meet formulas (10) to (13).

The user equipment in this embodiment may be configured to execute the technical solution in the method embodiment shown in FIG. 13. Implementation principles and technical effects thereof are similar, and details are not described herein again.

Persons of ordinary skill in the art may understand that all or some of the steps of the foregoing method embodiments may be implemented by a program instructing relevant hardware. The foregoing program may be stored in a computer readable storage medium. When the program runs, the steps of the foregoing method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:

receiving, by a base station, a signal sent by user equipment (UE);

selecting, by the base station, a shift serial number v, wherein the v belongs to a range of 0 to $(n_{shift}^{RA} n_{group}^{RA} + \bar{n}_{shift}^{RA} - 1)$;

obtaining, by the base station, a cyclic shift value $C_v$, wherein $C_v$ meets a following formula (1):

$$C_v = d_{offset} + d_{start} \lfloor v/n_{shift}^{RA} \rfloor + (v \bmod n_{shift}^{RA}) N_{CS} \quad (1);$$

wherein $d_{offset}$ is a positive number or 0 (zero), and $N_{CS}$ is a quantity of cyclic shifts for the UE; and $n_{shift}^{RA}$, $d_{start}$, $n_{group}^{RA}$, and $\bar{n}_{shift}^{RA}$ meet formulas (2) to (5); or $n_{shift}^{RA}$, $d_{start}$, $n_{group}^{RA}$, and $\bar{n}_{shift}^{RA}$ meet formulas (6) to (9); or $n_{shift}^{RA}$, $d_{start}$, $n_{group}^{RA}$, and $\bar{n}_{shift}^{RA}$ meet formulas (10) to (13):

$$n_{shift}^{RA} = \lfloor d_u/N_{CS} \rfloor \quad (2);$$

$$d_{start} = 4d_u + n_{shift}^{RA} N_{CS} \quad (3);$$

$$n_{group}^{RA} = \lfloor N_{ZC}/d_{start} \rfloor \quad (4);$$

$$\bar{n}_{shift}^{RA} = \max(\lfloor (N_{ZC} - 4d_u - n_{group}^{RA} d_{start})/N_{CS} \rfloor, 0) \quad (5);$$

$$n_{shift}^{RA} = \lfloor (N_{ZC} - 4d_u)/N_{CS} \rfloor \quad (6);$$

$$d_{start} = N_{ZC} - 4d_u + n_{shift}^{RA} N_{CS} \quad (7);$$

$$n_{group}^{RA} = \lfloor d_u/d_{start} \rfloor \quad (8);$$

$$\bar{n}_{shift}^{RA} = \min(\max(\lfloor (d_u - n_{group}^{RA} d_{start})/N_{CS} \rfloor, 0), n_{shift}^{RA}) \quad (9);$$

$$n_{shift}^{RA} = \lfloor (N_{ZC} - 3d_u)/N_{CS} \rfloor \quad (10);$$

$$d_{start} = N_{ZC} - 3d_u + n_{shift}^{RA} N_{CS} \quad (11);$$

$$n_{group}^{RA} = \lfloor d_u/d_{start} \rfloor \quad (12); \text{ and}$$

$$\bar{n}_{shift}^{RA} = 0 \quad (13);$$

wherein, u is a root of a random access ZC sequence, $d_u = u^{-1}$, $u^{-1}$ is a minimum non-negative integer meeting formula $((u^{-1}) \times u) \bmod N_{zc} = 1$, and $N_{zc}$ is the length of the random access ZC sequence; and wherein the method further comprises:
obtaining, by the base station, the random access ZC sequence according to the $C_v$; and
detecting, by the base station, the signal using the random access ZC sequence.

2. The method according to claim 1, wherein when $N_{CS} \leq d_u < N_{ZC}/5$, $n_{shift}^{RA}$, $d_{start}$, $n_{group}^{RA}$, and $\bar{n}_{shift}^{RA}$ meet formulas (2) to (5); when $N_{ZC}/5 \leq d_u \leq (N_{ZC}-N_{CS})/4$, $n_{shift}^{RA}$, $d_{start}$, $n_{group}^{RA}$, and $\bar{n}_{shift}^{RA}$ meet formulas (6) to (9); or when $(N_{ZC}+N_{CS})/4 \leq d_u \leq (N_{ZC}-N_{CS})/3$, $n_{shift}^{RA}$, $d_{start}$, $n_{group}^{RA}$, and $\bar{n}_{shift}^{RA}$ meet formulas (10) to (13).

3. A method for generating a random access channel ZC sequence, comprising:

selecting, by user equipment (UE), a shift serial number v, wherein the v belongs to a range of 0 to $(n_{shift}^{RA} n_{group}^{RA} + \bar{n}_{shift}^{RA} - 1)$;

obtaining, by the UE, a cyclic shift value $C_v$ according to the shift serial number v, wherein $C_v$ meets a following formula (1):

$$C_v = d_{offset} + d_{start} \lfloor v/n_{shift}^{RA} \rfloor + (v \bmod n_{shift}^{RA}) N_{CS} \quad (1),$$

wherein $d_{offset}$ is a positive number or 0 (zero), and $N_{cs}$ is a quantity of cyclic shifts for the UE; and wherein $n_{shift}^{RA}$, $d_{start}$, $n_{group}^{RA}$, and $\bar{n}_{shift}^{RA}$ meet formulas (2) to (5); or $n_{shift}^{RA}$, $d_{start}$, $n_{group}^{RA}$, and $\bar{n}_{shift}^{RA}$ meet formulas (6) to (9); or $n_{shift}^{RA}$, $d_{start}$, $n_{group}^{RA}$, and $\bar{n}_{shift}^{RA}$ meet formulas (10) to (13):

$$n_{shift}^{RA} = \lfloor d_u/N_{CS} \rfloor \quad (2);$$

$$d_{start} = 4d_u + n_{shift}^{RA} N_{CS} \quad (3);$$

$$n_{group}^{RA} = \lfloor N_{ZC}/d_{start} \rfloor \quad (4);$$

$$\bar{n}_{shift}^{RA} = \max(\lfloor (N_{ZC} - 4d_u - n_{group}^{RA} d_{start})/N_{CS} \rfloor, 0) \quad (5);$$

$$n_{shift}^{RA} = \lfloor (N_{ZC} - 4d_u)/N_{CS} \rfloor \quad (6);$$

$$d_{start} = N_{ZC} - 4d_u + n_{shift}^{RA} N_{CS} \quad (7);$$

$$n_{group}^{RA} = \lfloor d_u/d_{start} \rfloor \quad (8);$$

$$\bar{n}_{shift}^{RA} = \min(\max(\lfloor (d_u - n_{group}^{RA} d_{start})/N_{CS} \rfloor, 0), n_{shift}^{RA}) \quad (9);$$

$$n_{shift}^{RA} = \lfloor (N_{ZC} - 3d_u)/N_{CS} \rfloor \quad (10);$$

$$d_{start} = N_{ZC} - 3d_u + n_{shift}^{RA} N_{CS} \quad (11);$$

$$n_{group}^{RA} = \lfloor d_u/d_{start} \rfloor \quad (12); \text{ and}$$

$$\bar{n}_{shift}^{RA} = 0 \quad (13);$$

wherein, u is a root of the random access ZC sequence, $d_u = u^{-1}$, $u^{-1}$ is a minimum non-negative integer meeting formula $(u^{-1} \times u) \bmod N_{ZC} = 1$, and $N_{zc}$ is the length of the random access ZC sequence; and wherein the method further comprises:
obtaining, by the UE, the random access ZC sequence according to the $C_v$; and
sending, by the UE, the random access ZC sequence to a base station.

4. The method according to claim 3, wherein when $N_{CS} \leq d_u < N_{ZC}/5$, $n_{shift}^{RA}$, $d_{start}$, $n_{group}^{RA}$, and $\bar{n}_{shift}^{RA}$ meet formulas (2) to (5); when $N_{ZC}/5 \leq d_u \leq (N_{ZC}-N_{CS})/4$, $n_{shift}^{RA}$, $d_{start}$, $n_{group}^{RA}$, and $\bar{n}_{shift}^{RA}$ meet formulas (6) to (9); or when $(N_{ZC}+N_{CS})/4 \leq d_u \leq (N_{ZC}-N_{CS})/3$, $n_{shift}^{RA}$, $d_{start}$, $n_{group}^{RA}$, and $\bar{n}_{shift}^{RA}$ meet formulas (10) to (13).

5. A base station, comprising a processor and a non-transitory computer readable storage medium, wherein the non-transitory computer readable storage medium stores a program, and when the program is executed by the processor, the processor performs the following:
   receiving a signal sent by user equipment (UE);
   selecting a shift serial number v, wherein the v belongs to a range of 0 to $(n_{shift}^{RA} n_{group}^{RA} + \bar{n}_{shift}^{RA} - 1)$;
   obtaining a cyclic shift value $C_v$, wherein $C_v$ meets a following formula (1):

$$C_v = d_{offset} + d_{start} \lfloor v/n_{shift}^{RA} \rfloor + (v \bmod n_{shift}^{RA}) N_{CS} \quad (1);$$

wherein $d^{offset}$ is a positive number or 0 (zero), and $N_{CS}$ is a quantity of cyclic shifts for the UE; and
wherein $n_{shift}^{RA}$, $d_{start}$, $n_{group}^{RA}$, and $\bar{n}_{shift}^{RA}$ meet formulas (2) to (5); or $n_{shift}^{RA}$, $d_{start}$, $n_{group}^{RA}$, and $\bar{n}_{shift}^{RA}$ meet formulas (6) to (9); or $n_{shift}^{RA}$, $d_{start}$, $n_{group}^{RA}$, and $\bar{n}_{shift}^{RA}$ meet formulas (10) to (13):

$$n_{shift}^{RA} = \lfloor d_u/N_{CS} \rfloor \quad (2);$$

$$d_{start} = 4d_u + n_{shift}^{RA} N_{CS} \quad (3);$$

$$n_{group}^{RA} = \lfloor N_{ZC}/d_{start} \rfloor \quad (4);$$

$$\bar{n}_{shift}^{RA} = \max(\lfloor (N_{ZC} - 4d_u - n_{group}^{RA} d_{start})/N_{CS} \rfloor, 0) \quad (5);$$

$$n_{shift}^{RA} = \lfloor (N_{ZC} - 4d_u)/N_{CS} \rfloor \quad (6);$$

$$d_{start} = N_{ZC} - 4d_u + n_{shift}^{RA} N_{CS} \quad (7);$$

$$n_{group}^{RA} = \lfloor d_u/d_{start} \rfloor \quad (8);$$

$$\bar{n}_{shift}^{RA} = \min(\max(\lfloor (d_u - n_{group}^{RA} d_{start})/N_{CS} \rfloor, 0), n_{shift}^{RA}) \quad (9);$$

$$n_{shift}^{RA} = \lfloor (N_{ZC} - 3d_u)/N_{CS} \rfloor \quad (10);$$

$$d_{start} = N_{ZC} - 3d_u + n_{shift}^{RA} N_{CS} \quad (11);$$

$$n_{group}^{RA} = \lfloor d_u/d_{start} \rfloor \quad (12); \text{ and}$$

$$\bar{n}_{shift}^{RA} = 0 \quad (13);$$

wherein u is a root of a random access ZC sequence, $d_u = u^{-1}$, $u^{-1}$ is a minimum non-negative integer meeting formula $((u^{-1}) \times u) \bmod N_{ZC} = 1$, and $N_{ZC}$ is the length of the random access ZC sequence; and
wherein when the program is executed by the processor, the processor further performs the following: detecting the signal using the random access ZC sequence.

6. The base station according to claim 5, wherein when $N_{CS} \leq d_u < N_{ZC}/5$, $n_{shift}^{RA}$, $d_{start}$, $n_{group}^{RA}$, and $\bar{n}_{shift}^{RA}$ meet formulas (2) to (5); when $N_{ZC}/5 \leq d_u \leq (N_{ZC}-N_{CS})/4$, $n_{shift}^{RA}$, $d_{start}$, $n_{group}^{RA}$, and $\bar{n}_{shift}^{RA}$ meet formulas (6) to (9); or when $(N_{ZC}+N_{CS})/4 \leq d_u \leq (N_{ZC}-N_{CS})/3$, $n_{shift}^{RA}$, $d_{start}$, $n_{group}^{RA}$, and $\bar{n}_{shift}^{RA}$ meet formulas (10) to (13).

7. User equipment (UE), comprising a processor and a non-transitory computer readable storage medium, wherein the non-transitory computer readable storage medium stores a program, and when the program is executed by the processor, the following steps are performed:
   selecting a shift serial number v, wherein the v belongs to a range of 0 to $(n_{shift}^{RA} n_{group}^{RA} + \bar{n}_{shift}^{RA} - 1)$;
   obtaining a cyclic shift value $C_v$ according to the shift serial number v, wherein $C_v$ meets a following formula (1):

$$C_v = d_{offset} + d_{start} \lfloor v/n_{shift}^{RA} \rfloor + (v \bmod n_{shift}^{RA}) N_{CS} \quad (1),$$

wherein $d_{offset}$ is a positive number or 0 (zero), and $N_{CS}$ is a quantity of cyclic shifts for the UE; and
wherein $n_{shift}^{RA}$, $d_{start}$, $n_{group}^{RA}$, and $\bar{n}_{shift}^{RA}$ meet formulas (2) to (5); or $n_{shift}^{RA}$, $d_{start}$, $n_{group}^{RA}$, and $\bar{n}_{shift}^{RA}$ meet formulas (6) to (9); or $n_{shift}^{RA}$, $d_{start}$, $n_{group}^{RA}$, and $\bar{n}_{shift}^{RA}$ meet formulas (10) to (13):

$$n_{shift}^{RA} = \lfloor d_u/N_{CS} \rfloor \quad (2);$$

$$d_{start} = 4d_u + n_{shift}^{RA} N_{CS} \quad (3);$$

$$n_{group}^{RA} = \lfloor N_{ZC}/d_{start} \rfloor \quad (4);$$

$$\bar{n}_{shift}^{RA} = \max(\lfloor (N_{ZC} - 4d_u - n_{group}^{RA} d_{start})/N_{CS} \rfloor, 0) \quad (5);$$

$$n_{shift}^{RA} = \lfloor (N_{ZC} - 4d_u)/N_{CS} \rfloor \quad (6);$$

$$d_{start} = N_{ZC} - 4d_u + n_{shift}^{RA} N_{CS} \quad (7);$$

$$n_{group}^{RA} = \lfloor d_u/d_{start} \rfloor \quad (8);$$

$$\bar{n}_{shift}^{RA} = \min(\max(\lfloor (d_u - n_{group}^{RA} d_{start})/N_{CS} \rfloor, 0), n_{shift}^{RA}) \quad (9);$$

$$n_{shift}^{RA} = \lfloor (N_{ZC} - 3d_u)/N_{CS} \rfloor \quad (10);$$

$$d_{start} = N_{ZC} - 3d_u + n_{shift}^{RA} N_{CS} \quad (11);$$

$$n_{group}^{RA} = \lfloor d_u/d_{start} \rfloor \quad (12); \text{ and}$$

$$\bar{n}_{shift}^{RA} = 0 \quad (13);$$

wherein u is a root of a random access ZC sequence, $d_u = u^{-1}$, $u^{-1}$ is a minimum non-negative integer meeting formula $((u^{-1}) \times u) \bmod N_{ZC} = 1$, and $N_{ZC}$ is the length of the random access ZC sequence; and
wherein when the program is executed by the processor, the following steps are further performed:
   generating the random access ZC sequence according to the $C_v$;
   sending the random access ZC sequence to a base station.

8. The UE according to claim 7, wherein when $N_{CS} \leq d_u < N_{ZC}/5$, $n_{shift}^{RA}$, $d_{start}$, $n_{group}^{RA}$, and $\bar{n}_{shift}^{RA}$ meet formulas (2) to (5); when $N_{ZC}/5 \leq d_u \leq (N_{ZC}-N_{CS})/4$, $n_{shift}^{RA}$, $d_{start}$, $n_{group}^{RA}$, and $\bar{n}_{shift}^{RA}$ meet formulas (6) to (9); or when $(N_{ZC}+N_{CS})/4 \leq d_u \leq (N_{ZC}-N_{CS})/3$, $n_{shift}^{RA}$, $d_{start}$, $n_{group}^{RA}$, and $\bar{n}_{shift}^{RA}$ meet formulas (10) to (13).

9. The method according claim 1, wherein obtaining the random access ZC sequence according to the $C_v$, comprises:
   generating the random access ZC sequence $x_{u,C_v}(n)$ according to the $C_v$, wherein $x_{u,C_v}(n)$ meets a following formula (14):

$$x_{u,C_v}(n) = x_u((n+C_v) \bmod N_{ZC}) \quad (14)$$

wherein $x^u(n)$ meets $$x_u(n) = e^{-j\frac{\pi u n(n+1)}{N_{ZC}}},$$

$0 \leq n \leq N_{ZC}-1$.

10. The method according claim 3, wherein obtaining the random access ZC sequence according to the $C_v$ comprises:
   generating the random access ZC sequence $x_{u,C_v}(n)$ according to the $C_v$, wherein $x_{u,C_v}(n)$ meets following formula (14):

$$x_{u,C_v}(n) = x_u((n+C_v) \bmod N_{ZC}) \quad (14)$$

wherein $x^u(n)$ meets $$x_u(n) = e^{-j\frac{\pi u n(n+1)}{N_{ZC}}},$$

$0 \leq n \leq N_{ZC}-1$.

11. The method according claim 3, wherein, $d_u$ is a cyclic shift to which a ZC sequence corresponds when a Doppler frequency shift is one time a physical random access channel (PRACH) subcarrier spacing.

12. The method according claim 3, wherein before obtaining the random access ZC sequence, the method further comprises:
receiving, by the UE, notification signaling, wherein the notification signaling instructs the UE to generate the random access ZC sequence using a second restricted set in a random access set, wherein the random access set includes an unrestricted set, a first restricted set, and the second restricted set.

13. The method according claim 12, wherein the second restricted set is a random access set that the UE needs to use when a Doppler frequency shift of the UE is greater than or equal to a first predetermined value, and wherein the first predetermined value is greater than one time a physical random access channel (PRACH) subcarrier spacing.

14. The method according claim 13, wherein the first restricted set is a random access set that the UE needs to use when the Doppler frequency shift of the UE is greater than or equal to a second predetermined value, and the second predetermined value is less than the first predetermined value.

15. The base station according claim 5, further comprising:
generating the random access ZC sequence $x_{u,C_v}(n)$ according to the $C_v$, wherein $x_{u,C_v}(n)$ meets following formula (14):

$$x_{u,C_v}(n) = x_u((n+C_v) \bmod N_{ZC}) \tag{14}$$

wherein $x_u(n)$ meets $$x_u(n) = e^{-j\frac{\pi u n(n+1)}{N_{ZC}}},$$

$0 \leq n \leq N_{ZC}-1$.

16. The UE according claim 7, wherein generating the random access ZC sequence according to the $C_v$, comprises:
generating the random access ZC sequence $x_{u,C_v}(n)$ according to the $_v$, wherein $x_{u,C_v}(n)$ meets following formula (14):

$$x_{u,C_v}(n) = x_u((n+C_v) \bmod N_{ZC}) \tag{14}$$

wherein $x_u(n)$ meets $$x_u(n) = e^{-j\frac{\pi u n(n+1)}{N_{ZC}}},$$

$0 \leq n \leq N_{ZC}-1$.

* * * * *

UNITED STATES PATENT AND TRADEMARK OFFICE
CERTIFICATE OF CORRECTION

PATENT NO. : 10,524,292 B2
APPLICATION NO. : 15/367545
DATED : December 31, 2019
INVENTOR(S) : Wu et al.

It is certified that error appears in the above-identified patent and that said Letters Patent is hereby corrected as shown below:

In the Claims

In Column 35, Line 49-50, Claim 5, delete "the processor further performs the following: detecting the signal using the random access ZC sequence" and insert --the processor further performs the following:
obtaining the random access ZC sequence according to the $C_v$; and detecting the signal using the random access ZC sequence--.

In Column 36, Line 54, Claim 9, delete "wherein x"(n) meets" and insert --wherein $x_u(n)$ meets--.

In Column 37, Line 1, Claim 10, delete "wherein x"(n) meets" and insert --wherein $x_u(n)$ meets--.

In Column 38, Line 18-19, Claim 16, delete "generating the random access ZC sequence $x_{u,Cv}$ (n)according to the $_v$, wherein $x_{u,Cv}$ (n) meets following formula (14):" and insert --generating the random access ZC sequence $x_{u,C_v}$ (*n*) according to the $C_v$, wherein $x_{u,C_v}$ (*n*) meets following formula (14):--.

Signed and Sealed this
Tenth Day of March, 2020

Andrei Iancu
*Director of the United States Patent and Trademark Office*